(12) United States Patent
Hu

(10) Patent No.: US 11,333,855 B2
(45) Date of Patent: May 17, 2022

(54) IMAGING LENS ASSEMBLY

(71) Applicant: Zhejiang Sunny Optical Co., Ltd, Ningbo (CN)

(72) Inventor: Yabin Hu, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 799 days.

(21) Appl. No.: 16/067,061

(22) PCT Filed: Sep. 20, 2017

(86) PCT No.: PCT/CN2017/102429
§ 371 (c)(1),
(2) Date: Jun. 28, 2018

(87) PCT Pub. No.: WO2018/192166
PCT Pub. Date: Oct. 25, 2018

(65) Prior Publication Data
US 2021/0048621 A1      Feb. 18, 2021

(30) Foreign Application Priority Data

Apr. 18, 2017   (CN) .......................... 201710253905.3
Apr. 18, 2017   (CN) .......................... 201720406012.3

(51) Int. Cl.
*G02B 13/00*   (2006.01)
*G02B 9/60*    (2006.01)

(52) U.S. Cl.
CPC ........... *G02B 13/0045* (2013.01); *G02B 9/60* (2013.01)

(58) Field of Classification Search
CPC ....... G02B 13/0045; G02B 9/60; G02B 13/00
See application file for complete search history.

(56) References Cited

U.S. PATENT DOCUMENTS

| | | | |
|---|---|---|---|
| 2013/0050847 A1* | 2/2013 | Hsu ......................... | G02B 9/60 359/714 |
| 2013/0314803 A1 | 11/2013 | Huang et al. | |
| 2015/0198790 A1* | 7/2015 | Tanaka ............... | G02B 13/0045 359/714 |
| 2016/0033747 A1* | 2/2016 | Tang .................. | G02B 13/0045 359/713 |

(Continued)

FOREIGN PATENT DOCUMENTS

| | | |
|---|---|---|
| CN | 102236153 A | 11/2011 |
| CN | 204515223 | 7/2015 |

(Continued)

*Primary Examiner* — Balram T Parbadia
*Assistant Examiner* — Gabriel A Sanz
(74) *Attorney, Agent, or Firm* — Hauptman Ham, LLP

(57) ABSTRACT

The present disclosure discloses an imaging lens assembly. The imaging lens assembly includes, sequentially from an object side to an image side, a first lens, a second lens, a third lens, a fourth lens and a fifth lens. An effective focal length f of the imaging lens assembly and an entrance pupil diameter EPD of the imaging lens assembly satisfy: f/EPD≤1.8, and an incident angle of a chief ray corresponding to a maximal field-of-view incident on an object-side surface of the fourth lens CRA4<15°. The imaging lens assembly according to the present disclosure consists of 5 lenses, which can realize an imaging lens assembly having an ultra-thin large aperture and a good image quality.

16 Claims, 9 Drawing Sheets

(56) References Cited

U.S. PATENT DOCUMENTS

2016/0161720 A1* 6/2016 Son ..................... G02B 9/60
  359/714
2016/0349489 A1  12/2016 Dai et al.
2017/0010445 A1   1/2017 Teraoka

FOREIGN PATENT DOCUMENTS

| CN | 105676421 A | 6/2016 |
|----|-------------|--------|
| CN | 106896481   | 6/2017 |
| CN | 206684372 U | 11/2017 |
| JP | 2013-11710 A | 1/2013 |
| JP | 2014153576 A | 8/2014 |
| KR | 20150044681 | 4/2015 |
| TW | 201333522 A | 8/2013 |

* cited by examiner

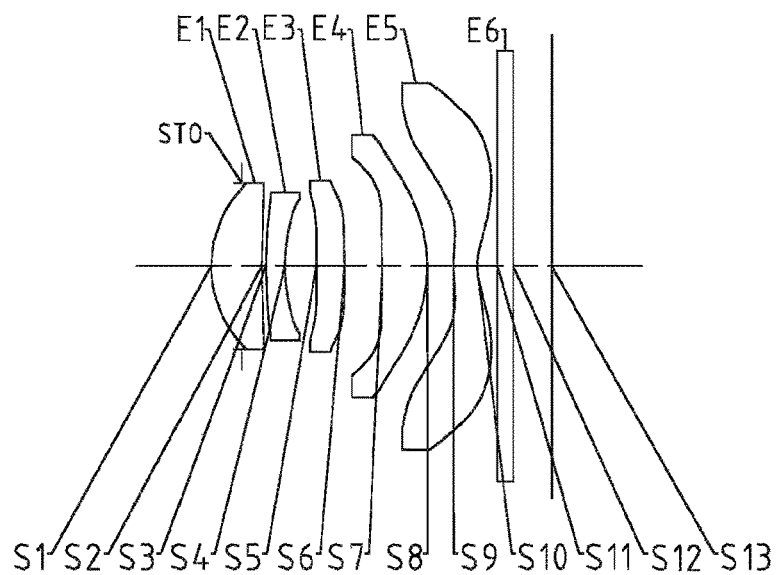
Fig. 1
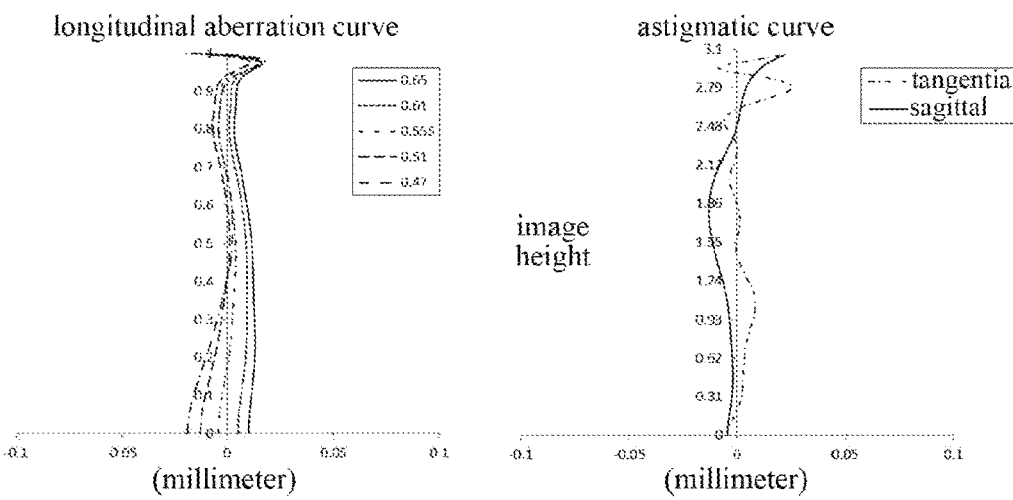
Fig. 2
Fig. 3
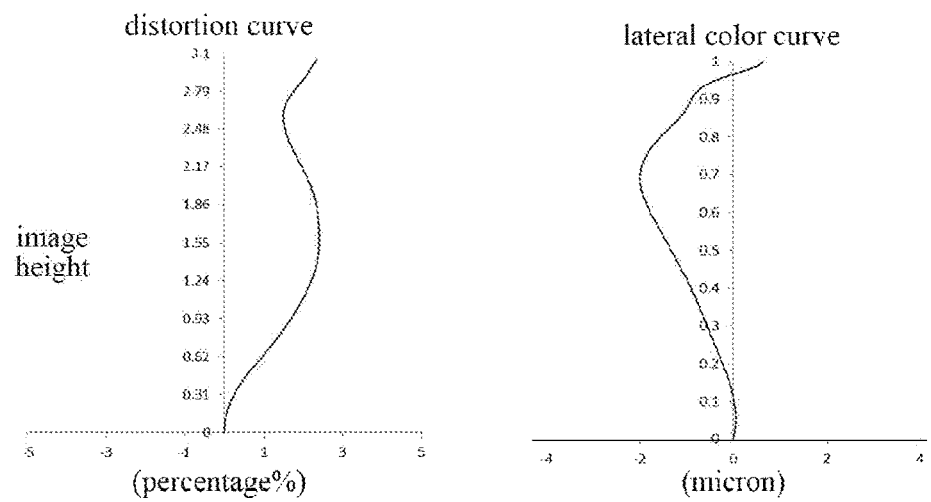
Fig. 4
Fig. 5

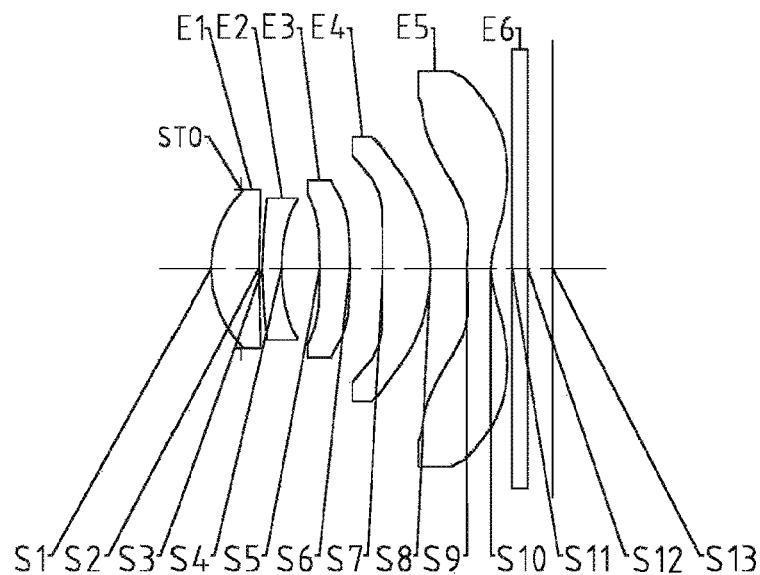
Fig. 6
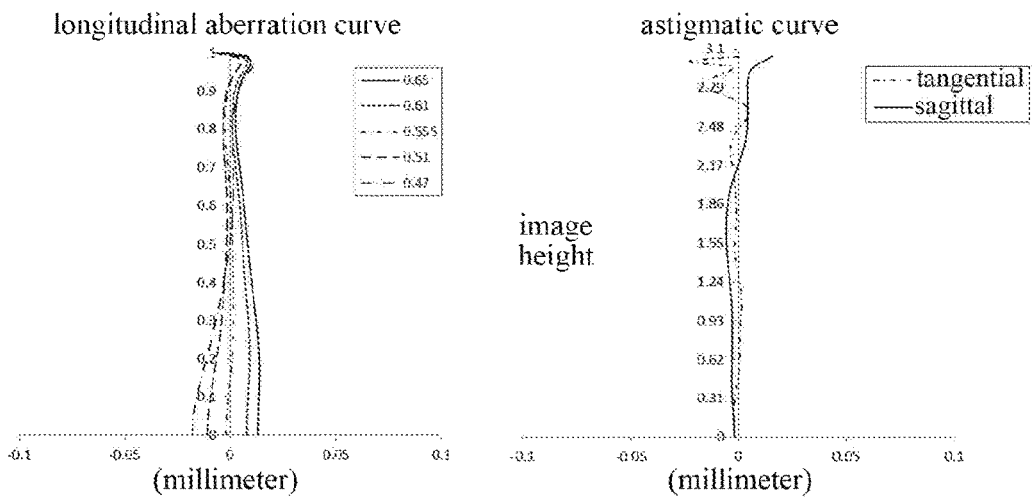
Fig. 7
Fig. 8
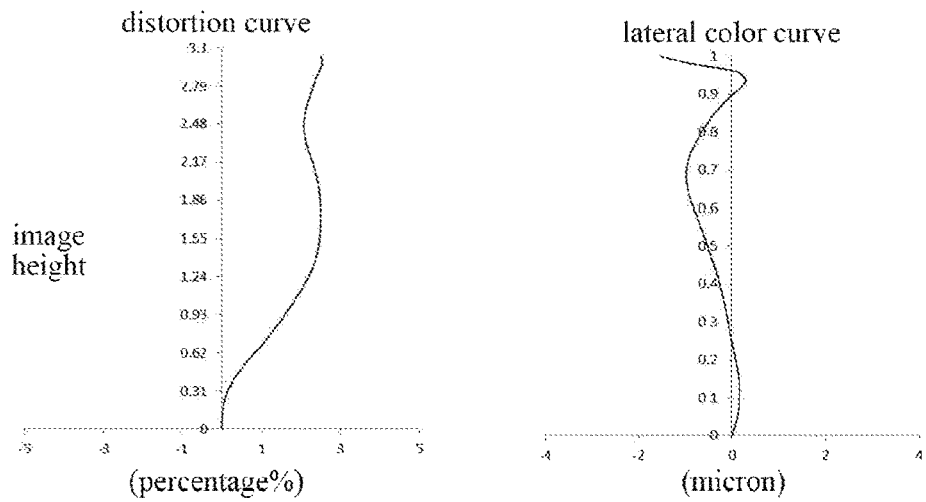
Fig. 9
Fig. 10

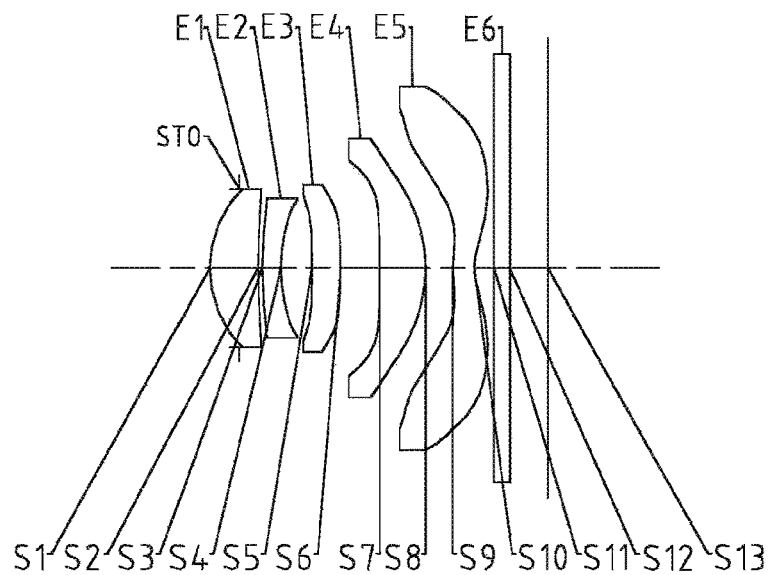
Fig. 11
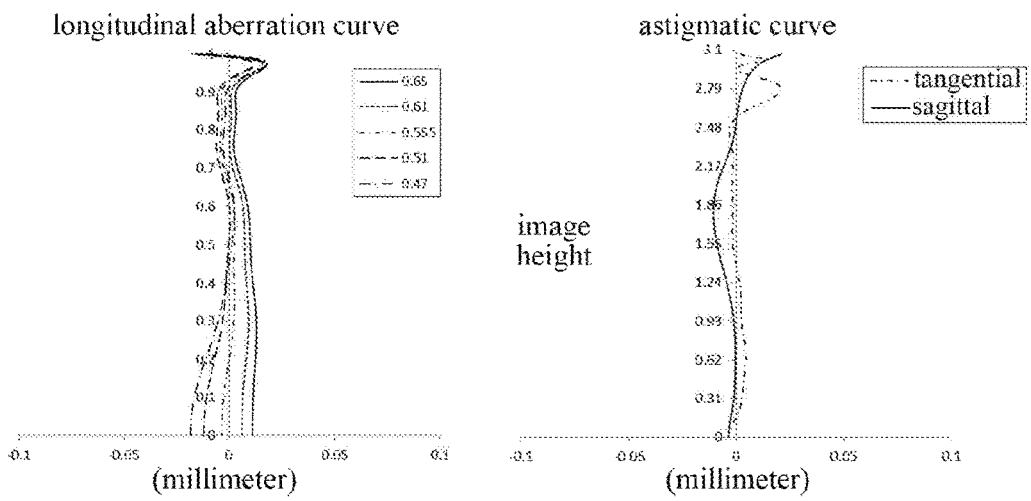
Fig. 12
Fig. 13
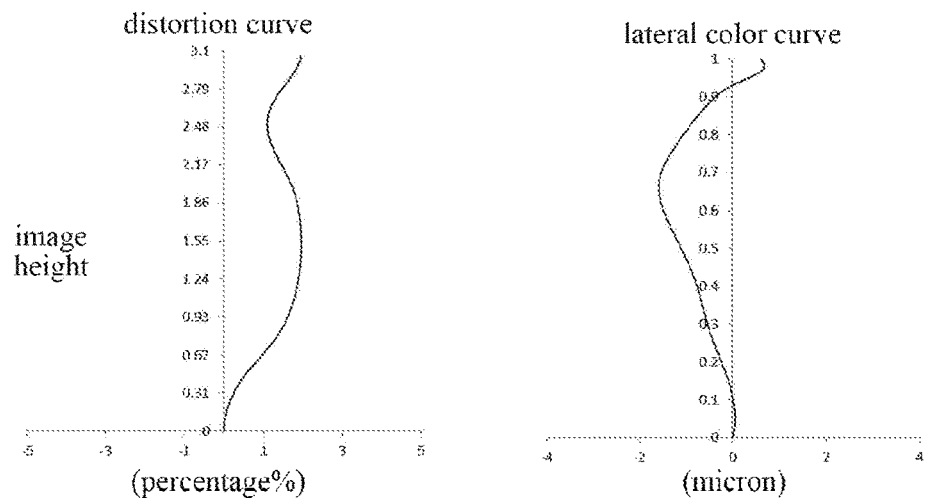
Fig. 14
Fig. 15

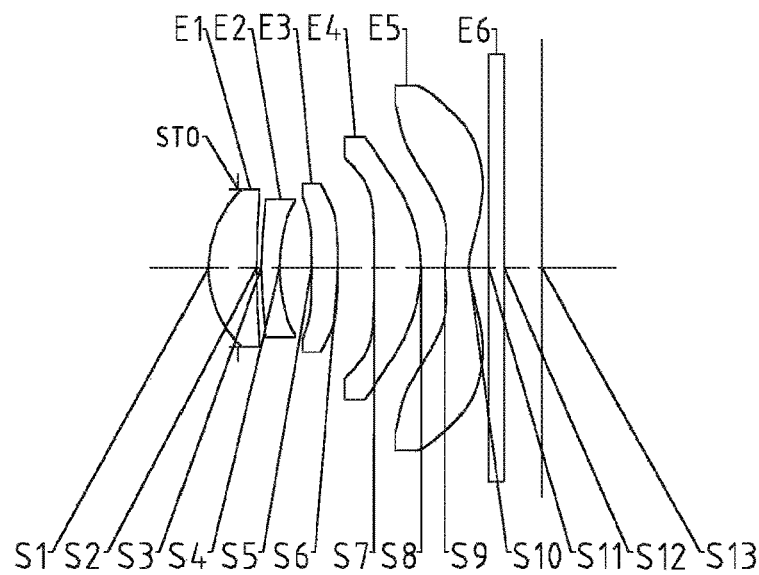
Fig. 16
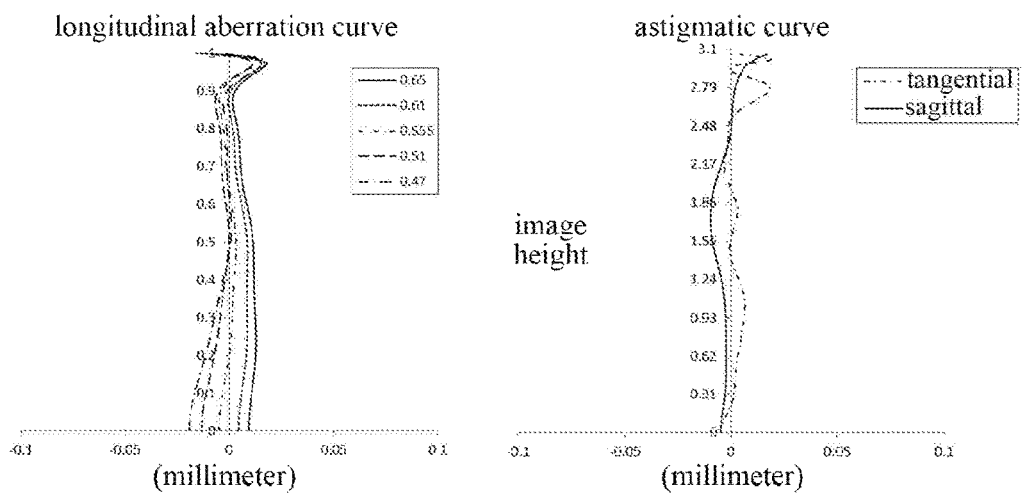
Fig. 17
Fig. 18
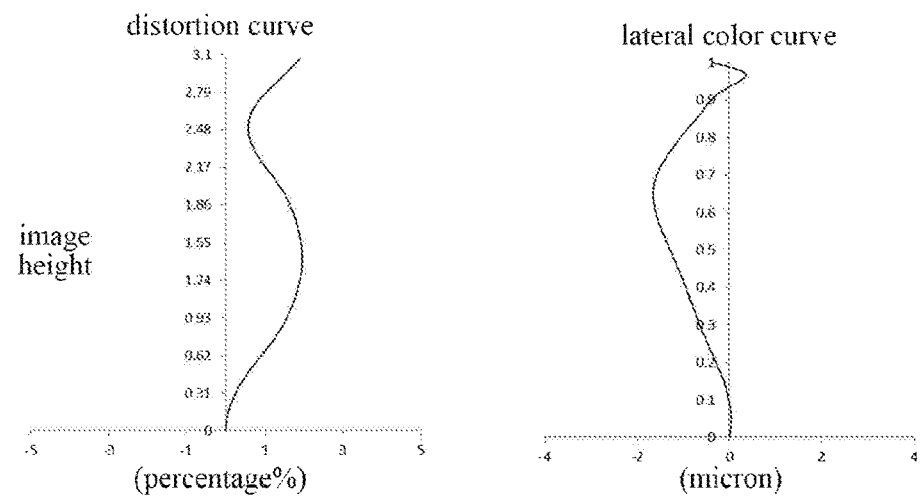
Fig. 19
Fig. 20

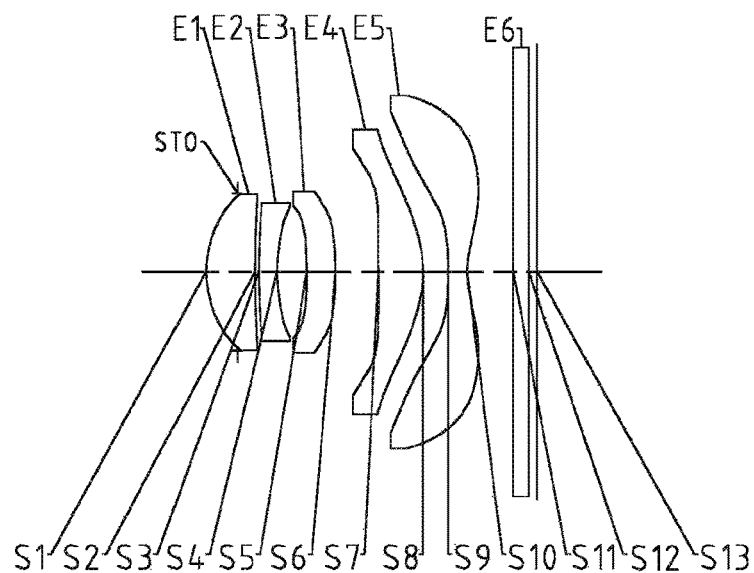
Fig. 26
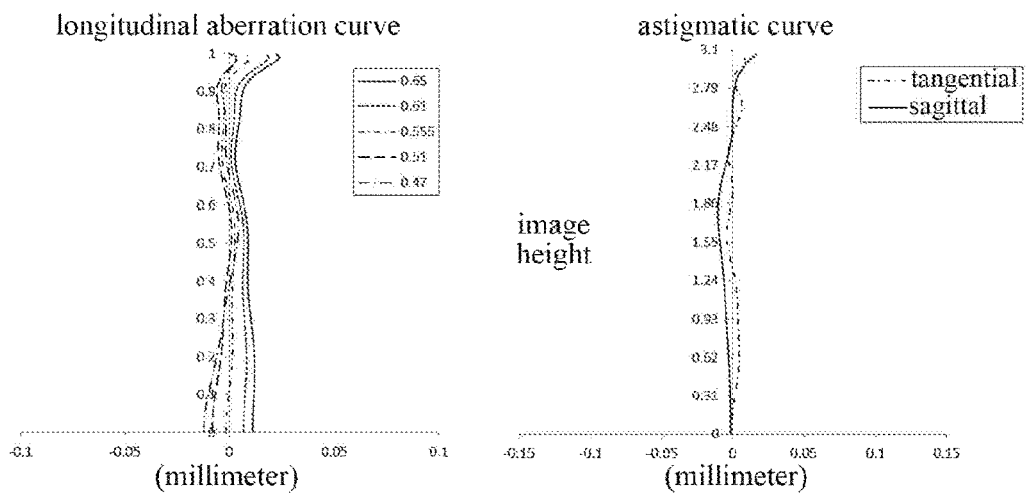
Fig. 27
Fig. 28
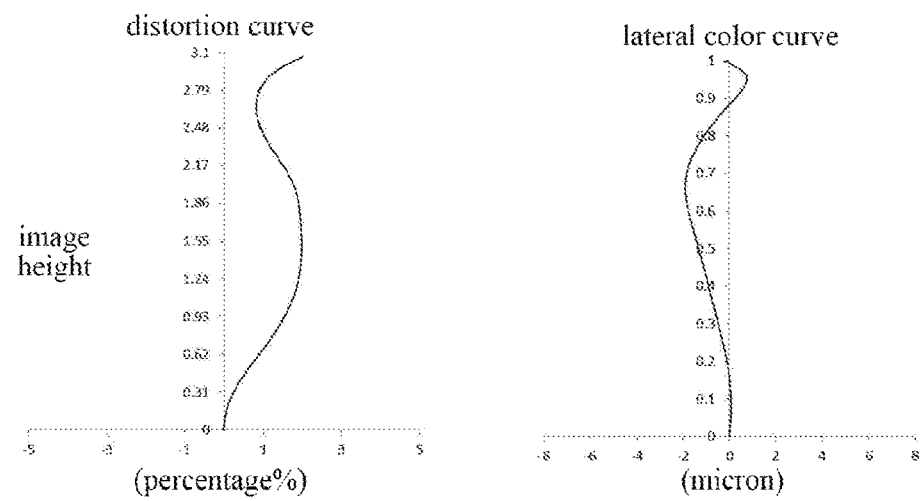
Fig. 29
Fig. 30

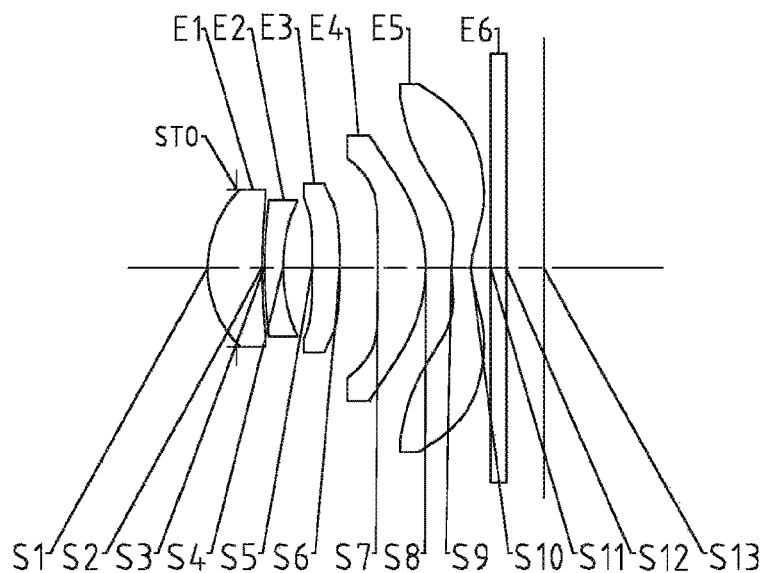
Fig. 36
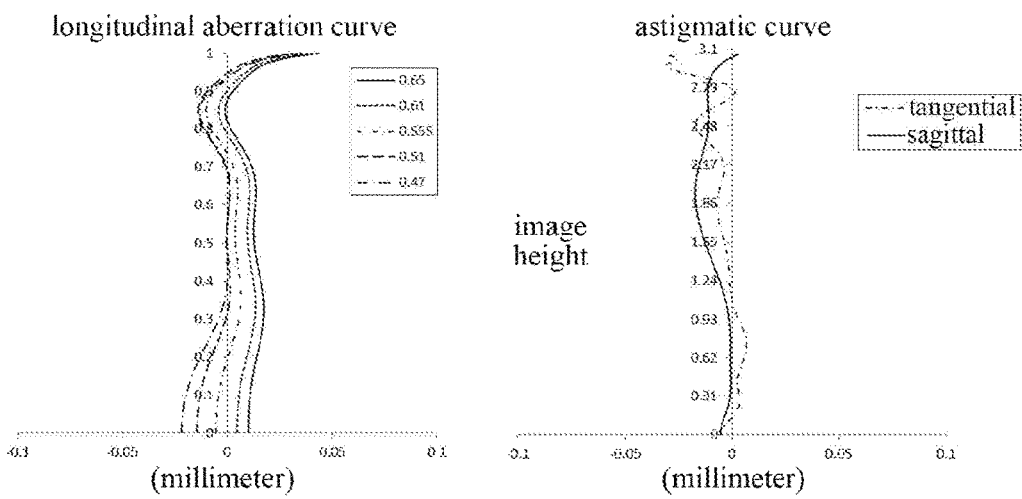
Fig. 37
Fig. 38
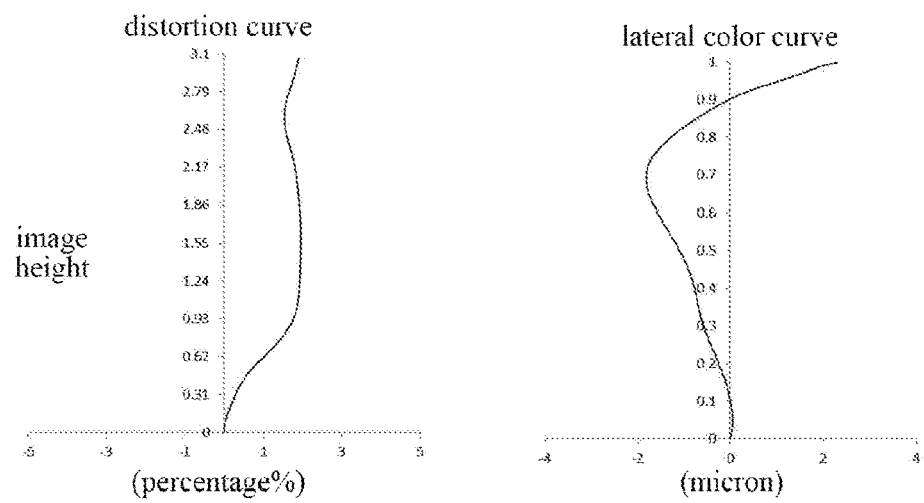
Fig. 39
Fig. 40

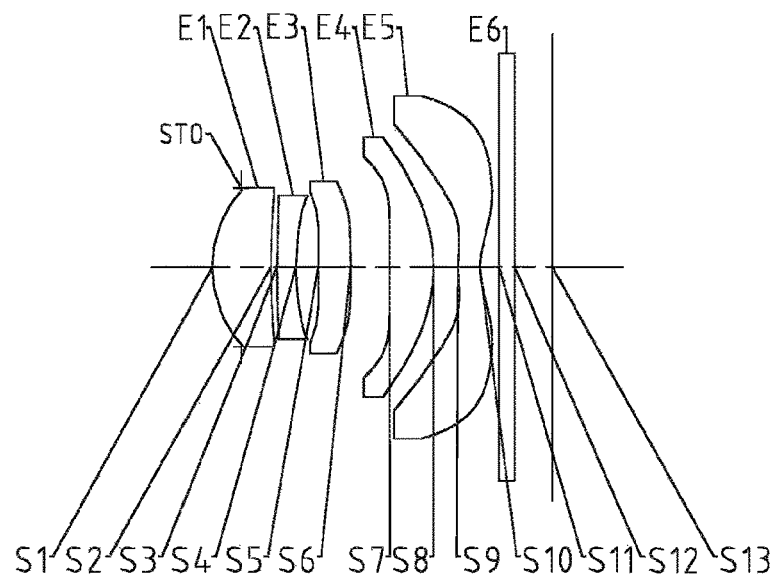
Fig. 41
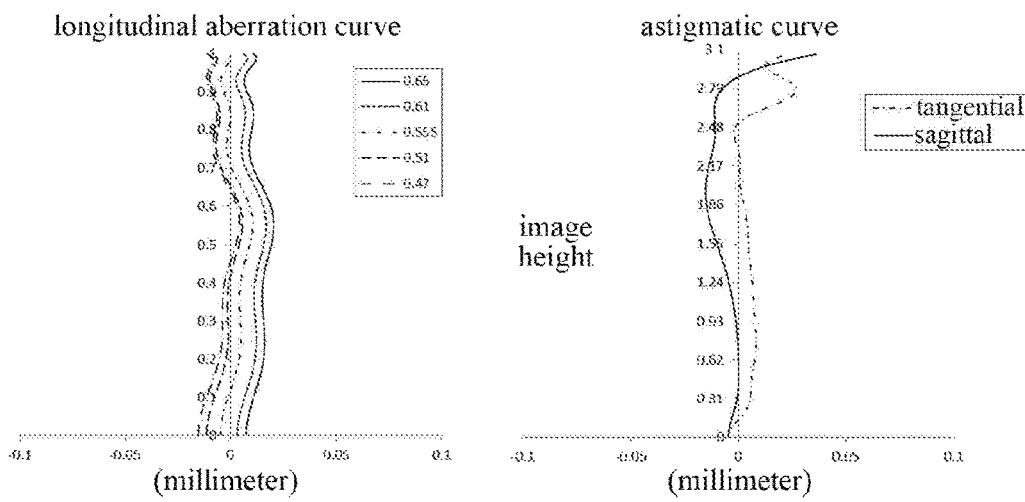
Fig. 42
Fig. 43
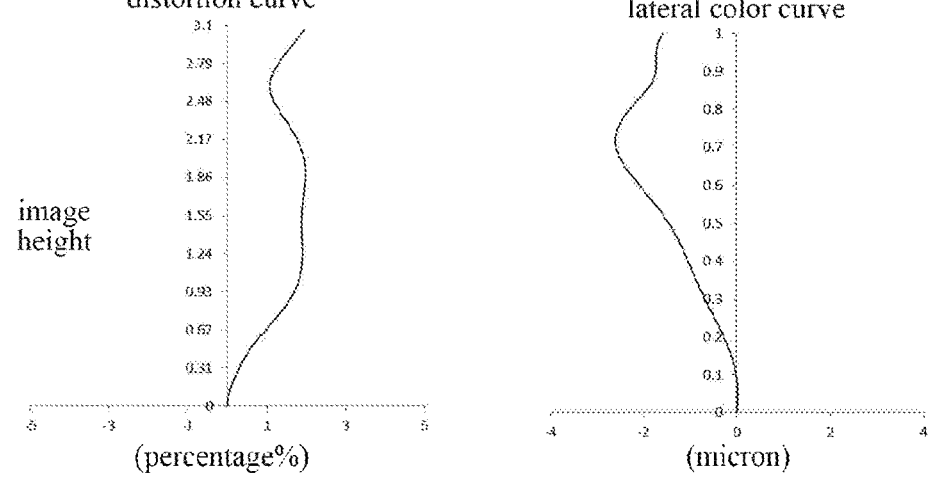
Fig. 44
Fig. 45

IMAGING LENS ASSEMBLY

RELATED APPLICATIONS

The present application is a National Phase of International Application Number PCT/CN2017/102429, filed Sep. 20, 2017, and claims the priority of China Application No. 201710253905.3, filed Apr. 18, 2017; and China Application No. 201720406012.3, filed Apr. 18, 2017.

TECHNICAL FIELD

The present disclosure relates to an imaging lens assembly, and specifically to a miniaturized imaging lens assembly comprising five lenses.

BACKGROUND

As CCD (charge-coupled device) and CMOS (complementary metal-oxide semiconductor) image sensors have increasingly higher performance and smaller size, higher requirements for high image quality and miniaturization are also imposed on the counterpart camera lens assembly.

To satisfy the miniaturization requirement, a typical configuration of an existing lens assembly has an F-number of 2.0 or above, to realize a good optical performance while archiving the size reduction of the lens assembly. However, with the continuous development of smart phones and other portable electronic products, higher requirements on imaging lens assemblies are brought forward, especially in situations such as insufficient lighting (e.g., cloudy and rainy days, at dusk) and hand trembling, thus the F-number of 2.0 or above has been unable to meet the higher imaging requirements.

Therefore, the present disclosure proposes an optical system applicable to the portable electronic products and having an ultra-thin, large aperture and a good image quality.

SUMMARY

In order to solve at least some of the problems in the prior art, the prevent disclosure provides an imaging lens assembly.

An aspect of the present disclosure provides an imaging lens assembly. The imaging lens assembly includes, sequentially from an object side of the imaging lens assembly to an image side, a first lens, a second lens, a third lens, a fourth lens and a fifth lens. An effective focal length f of the imaging lens assembly and an entrance pupil diameter EPD of the imaging lens assembly satisfy: $f/EPD \leq 1.8$, and an incident angle of a chief ray corresponding to a maximal field-of-view incident on an object-side surface of the fourth lens $CRA4 < 15°$.

Another aspect of the present disclosure provides an imaging lens assembly. The imaging lens assembly includes, sequentially from an object side of the imaging lens assembly to an image side, a first lens, a second lens, a third lens, a fourth lens and a fifth lens. The first lens has a positive refractive power, and an object-side surface of the first lens is a convex surface; the second lens has a negative refractive power; the third lens has a positive refractive power or a negative refractive power; the fourth lens has a positive refractive power or a negative refractive power; and the fifth lens has a negative refractive power. An effective focal length f of the imaging lens assembly and a combined focal length f12 of the first lens and the second lens satisfy: $0.7 \leq f/f12 < 1.0$.

According to an implementation of the present disclosure, $0.5 < R2/R3 < 2.0$, R2 is a radius of curvature of an image-side surface of the first lens, and R3 is a radius of curvature of an object-side surface of the second lens.

According to an implementation of the present disclosure, $4.0 < f1/CT1 < 6.0$, f1 is an effective focal length of the first lens, and CT1 is a center thickness of the first lens.

According to an implementation of the present disclosure, $5.5 < f/CT4 < 7.0$, f is the effective focal length of the imaging lens assembly, and CT4 is a center thickness of the fourth lens.

According to an implementation of the present disclosure, $1.0 \leq f/f1 < 1.5$, f is the effective focal length of the imaging lens assembly, and f1 is the effective focal length of the first lens.

According to an implementation of the present disclosure, $-1.0 < f/f2 < -0.3$, f is the effective focal length of the imaging lens assembly, and f2 is an effective focal length of the second lens.

According to an implementation of the present disclosure, $-2.0 < f/f5 < -0.7$, f is the effective focal length of the imaging lens assembly, and f5 is an effective focal length of the fifth lens.

According to an implementation of the present disclosure, $R1/R2 < 0.5$, R1 is a radius of curvature of the object-side surface of the first lens, and R2 is the radius of curvature of the image-side surface of the first lens.

According to an implementation of the present disclosure, $1.0 < f/R4 < 2.0$, f is the effective focal length of the imaging lens assembly, and R4 is a radius of curvature of an image-side surface of the second lens.

According to an implementation of the present disclosure, $|f/R7| < 1.0$, f is the effective focal length of the imaging lens assembly, and R7 is a radius of curvature of the object-side surface of the fourth lens.

According to an implementation of the present disclosure, $TTL/ImgH \leq 1.6$, TTL is an axial distance from the object-side surface of the first lens to an image plane, and ImgH is half of a diagonal length of an effective pixel area on the image plane.

The imaging lens assembly according to the present disclosure consists of 5 lenses, which can realize an imaging lens assembly having an ultra-thin large aperture and a good image quality.

BRIEF DESCRIPTION OF THE DRAWINGS

After reading detailed descriptions of non-limiting implementations with reference to the accompanying drawings, other features, objectives and advantages of the present disclosure will become more apparent. In the accompanying drawings:

FIG. 1 illustrates a schematic structural diagram of an imaging lens assembly according to Embodiment 1;

FIGS. 2-5 respectively illustrate a longitudinal aberration curve, an astigmatic curve, a distortion curve and a lateral color curve of the imaging lens assembly according to Embodiment 1;

FIG. 6 illustrates a schematic structural diagram of an imaging lens assembly according to Embodiment 2;

FIGS. 7-10 respectively illustrate a longitudinal aberration curve, an astigmatic curve, a distortion curve and a lateral color curve of the imaging lens assembly according to Embodiment 2;

FIG. 11 illustrates a schematic structural diagram of an imaging lens assembly according to Embodiment 3;

FIGS. 12-15 respectively illustrate a longitudinal aberration curve, an astigmatic curve, a distortion curve and a lateral color curve of the imaging lens assembly according to Embodiment 3;

FIG. 16 illustrates a schematic structural diagram of an imaging lens assembly according to Embodiment 4;

FIGS. 17-20 respectively illustrate a longitudinal aberration curve, an astigmatic curve, a distortion curve and a lateral color curve of the imaging lens assembly according to Embodiment 4;

FIG. 26 illustrates a schematic structural diagram of an imaging lens assembly according to Embodiment 6;

FIGS. 27-30 respectively illustrate a longitudinal aberration curve, an astigmatic curve, a distortion curve and a lateral color curve of the imaging lens assembly according to Embodiment 6;

FIG. 36 illustrates a schematic structural diagram of an imaging lens assembly according to Embodiment 8;

FIGS. 37-40 respectively illustrate a longitudinal aberration curve, an astigmatic curve, a distortion curve and a lateral color curve of the imaging lens assembly according to Embodiment 8;

FIG. 41 illustrates a schematic structural diagram of an imaging lens assembly according to Embodiment 9; and FIGS. 42-45 respectively illustrate a longitudinal aberration curve, an astigmatic curve, a distortion curve and a lateral color curve of the imaging lens assembly according to Embodiment 9.

DETAILED DESCRIPTION

Figure 21:
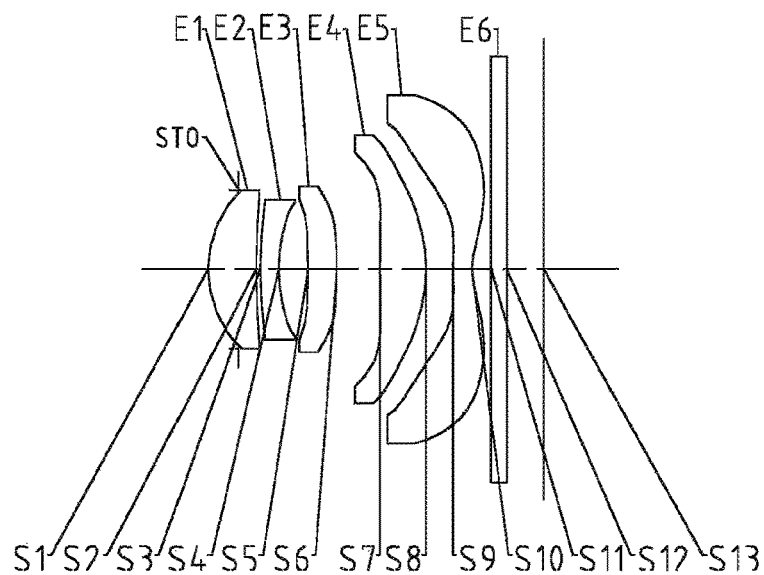
FIG. 21 illustrates a schematic structural diagram of an imaging lens assembly according to Embodiment 5.

The present disclosure will be further described in detail below with reference to the accompanying drawings and embodiments. It may be understood that the specific embodiments described herein are merely used to explain the related disclosure and not to limit the disclosure. It should also be noted that for the convenience of description, only the parts related to the related disclosure are shown in the accompanying drawings.

It should be understood that in the present disclosure, an element or layer may be directly on another element or layer, or directly connected to or coupled to another element or layer, or there may be an intervening element or layer, when the element or layer is described as being "on," "connected to" or "coupled to" another element or layer. When an element is referred to as being "directly on," "directly connected to" or "directly coupled to" another element or layer, there are no intervening elements or layers. Throughout the specification, the same reference numerals refer to the same elements. The expression "and/or" used in this text includes any and all combinations of one or more of the associated listed items.

It should be understood that although the terms $1^{st}$, $2^{nd}$, or first, second, etc. may be used herein to describe various elements, components, regions, layers, and/or sections, these elements, components, regions, layers, and/or sections should not be limited by these terms. These terms are only used to distinguish one element, component, region, layer or section from another element, component, region, layer or section. Thus, a first element, component, region, layer or section discussed below may be termed a second element, component, region, layer or section without departing from the teachings of the present disclosure.

The terminology used herein is for the purpose of describing specific implementations only and is not intended to limit the present disclosure. As used herein, unless explicitly stated otherwise in the context, a feature that is not limited to the singular or plural form is also intended to include features in plural form. It should be further understood that the terms "comprising," "including," "having" and variants thereof, when used in this specification, specify the presence of stated features, unities, steps, operations, elements and/or components, but do not exclude the presence or addition of one or more other features, unities, steps, operations, elements, components and/or combinations thereof. As used herein, the term "and/or" includes any and all combinations of one or more of the associated listed items. Expressions, such as "at least one of," when appearing after a list of elements, modify the entire list of elements rather than an individual element in the list. Further, the use of "may," when describing the implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

The present disclosure provides an imaging lens assembly. The imaging lens assembly according to the present disclosure is provided with: sequentially from an object side of the imaging lens assembly to an image side, a first lens, a second lens, a third lens, a fourth lens and a fifth lens.

In the embodiments of the present disclosure, the first lens has a positive refractive power, and an object-side surface of the first lens is a convex surface. In the embodiments of the present disclosure, the second lens has a negative refractive power. In the embodiments of the present disclosure, the third lens has a positive refractive power or a negative refractive power. In the embodiments of the present disclosure, the fourth lens has a positive refractive power or a negative refractive power. In the embodiments of the present disclosure, the fifth lens has a negative refractive power, and an image-side surface of the fifth lens is a concave surface at a paraxial position and changes from concave to convex as the image-side surface moves away from the optical axis.

In the embodiments of the present disclosure, an effective focal length f of the imaging lens assembly and an entrance pupil diameter EPD of the imaging lens assembly satisfy: f/EPD≤1.8, and an incident angle of a chief ray corresponding to a maximal field-of-view incident on an object-side surface of the fourth lens CRA4<15°. More specifically, it satisfies: f/EPD≤1.80, CRA4≤11.27°. An imaging lens assembly satisfying the above relationship can ensure that the F-number of the optical system is within 1.8 and has a large aperture characteristic. The control of the incident angle of the chief ray corresponding to the maximal field-of-view is for the matching of the system and an image sensor CRA and to improve an edge relative illumination.

In the embodiments of the present disclosure, 0.5<R2/R3<2.0, R2 is a radius of curvature of an image side surface of the first lens, and R3 is a radius of curvature of an object-side surface of the second lens. More specifically, it satisfies: 0.70≤R2/R3≤1.78. An imaging lens assembly satisfying the above relationship is for effectively correcting a system spherical aberration by controlling the radii of curvature of the first lens and the second lens in the case where the aperture of the system is increased.

In the embodiments of the present disclosure, 4.0<f1/CT1<6.0, f1 is an effective focal length of the first lens, and CT1 is a center thickness of the first lens. More specifically, it satisfies: 4.37≤f1/CT≤15.41. If the center thickness of a lens is too large or too small, it will be difficult to form the lens. An imaging lens assembly satisfying the above relationship can properly balance the focal length and the thickness of the first lens, and effectively correct a system aberration while facilitating processing.

In the embodiments of the present disclosure, 5.5<f/CT4<7.0, f is the effective focal length of the imaging lens assembly, and CT4 is a center thickness of the fourth lens. More specifically, it satisfies: 5.84≤f/CT46.42. The center thickness of a lens affects the value of the refractive power. The ratio of the center thickness of the fourth lens to the focal length of the system is controlled within a certain range. On the one hand, it is beneficial to correct a color difference of the system and helps to improve the distortion and a coma aberration in the meridional direction, and at the same time it is also advantageous for molding.

In the embodiments of the present disclosure, 1.0≤f/f1≤<1.5, f is the effective focal length of the imaging lens assembly, and f1 is the effective focal length of the first lens. More specifically, it satisfies: 1.07≤f/f1≤1.17. The spherical aberration of the system of a large aperture will increase. The first lens is in the form of a positive refractive power, so as to have the influence of improving the spherical aberration of the system while converging light.

In the embodiments of the present disclosure, −1.0<f/f2<−0.3, f is the effective focal length of the imaging lens assembly, and f2 is an effective focal length of the second lens. More specifically, it satisfies: −0.56f/f2≤−0.42. The second lens is in the form of a negative refractive power. The ratio is controlled within a certain range to offset a spherical aberration generated by the first lens to achieve the effect of improving the spherical aberration, which is also beneficial to take on the influence of a chromatic aberration generated by a positive lens.

In the embodiments of the present disclosure, −2.0<f/f5<−0.7, f is the effective focal length of the imaging lens assembly, and f5 is an effective focal length of the fifth lens. More specifically, it satisfies: −1.85≤f/f5≤−0.80. If the ratio is too large, the fifth lens will take on too much refractive power, resulting in a poor technology. If the ratio is too small, it is not conducive to correcting the distortion of the system. An imaging lens assembly satisfying the above relationship can overcome the above disadvantages.

In the embodiments of the present disclosure, 0.7≤f/f12<1.0, f is the effective focal length of the imaging lens assembly, and f12 is a combined focal length of the first lens and the second lens. More specifically, it satisfies: 0.7≤f/f12≤0.81. An imaging lens assembly satisfying the above relationship can ensure a proper distribution to the refractive powers of a front lens assembly by the system and improve the influence of the spherical aberration and coma aberration of the system on the image quality.

In the embodiments of the present disclosure, R1/R2<0.5, R1 is a radius of curvature of the object-side surface of the first lens, and R2 is the radius of curvature of the image-side surface of the first lens. More specifically, it satisfies: R1/R2≤0.24. Limiting this range may help to control the refractive power distribution of the first lens and also to make the shape of the lens within a reasonable range of manufacturing capabilities.

In the embodiments of the present disclosure, 1.0<f/R4<2.0, f is the effective focal length of the imaging lens assembly, and R4 is a radius of curvature of an image-side surface of the second lens. More specifically, it satisfies: 1.13≤f/R4≤1.79. If the radius of curvature of the image-side surface of the second lens is too small, there is a risk of easily generating a ghost image. If the radius of curvature of the image-side surface of the second lens is too large, it is not easy to correct an off-axis aberration of the system. An imaging lens assembly satisfying the above relationship can overcome the above disadvantages.

In the embodiments of the present disclosure, |f/R7|<1.0, f is the effective focal length of the imaging lens assembly, and R7 is a radius of curvature of the object-side surface of the fourth lens. More specifically, it satisfies: |f/R7|≤0.76. Limiting this range makes an angle of edge light incident on the fourth lens smaller, and reduces the adverse effects of polarization on the edge illumination.

In the embodiments of the present disclosure, TTL/ImgH≤1.6, TTL is an axial distance from the object-side surface of the first lens to an image plane, and ImgH is half of a diagonal length of an effective pixel area on the image plane. More specifically, it satisfies: TTL/ImgH≤1.56. Controlling this ratio range ensures that the system meets the requirement of an ultra-thin and miniaturized system structure while meeting the image quality requirement.

The present disclosure is further described in detail below in combination with the specific embodiments.

Embodiment 1

First, the imaging lens assembly according to Embodiment 1 of the present disclosure is described with reference to FIG. 1 to FIG. 5.

FIG. 1 is a schematic structural diagram illustrating the imaging lens assembly of Embodiment 1. As shown in FIG. 1, the imaging lens assembly includes five lenses. These five lenses are a first lens E1 having an object-side surface S1 and an image-side surface S2, a second lens E2 having an object-side surface S3 and an image-side surface S4, a third lens E3 having an object-side surface S5 and an image-side surface S6, a fourth lens E4 having an object-side surface S7 and an image-side surface S8 and a fifth lens E5 having an object-side surface S9 and an image-side surface S10, respectively. The first lens E1 to the fifth lens E5 are arranged in sequence from an object side to an image side of the imaging lens assembly. The first lens E1 may have a positive refractive power, and the object-side surface S1 of the first lens may be a convex surface; the second lens E2 may have a negative refractive power, and the image-side surface S4 of the second lens may be a concave surface; the third lens E3 may have a positive refractive power; the fourth lens E4 may have a positive refractive power; and the fifth lens E5 may have a negative refractive power, and the image-side surface S10 of the fifth lens is a concave surface at a paraxial position and changes from concave to convex as the image-side surface moves away from an optical axis. The imaging lens assembly further includes an optical filter E6 having an object-side surface S11 and an image-side surface S12 for filtering infrared light. In this embodiment, light from an object passes through the surfaces S1 to S12 sequentially and is finally imaged on an image plane S13.

In this embodiment, the first to fifth lenses E1-E5 have their effective focal lengths f1-f5, respectively. The first to fifth lenses E1-E5 are sequentially arranged along the optical axis and collectively determine the total effective focal length f of the imaging lens assembly. Table 1 below shows the effective focal lengths f1-f5 of the first to fifth lenses E1-E5, the total effective focal length f of the imaging lens assembly, the total track length TTL of the imaging lens assembly and the half of the maximal field-of-view HFOV of the imaging lens assembly.

TABLE 1

| f1(mm) | 3.50 | f(mm) | 3.75 |
|---|---|---|---|
| f2(mm) | −7.90 | TTL(mm) | 4.50 |
| f3(mm) | 28.78 | HFOV(°) | 38.6 |
| f4(mm) | 4.00 | | |
| f5(mm) | −3.10 | | |

Table 2 shows the surface type, the radius of curvature, the thickness, the material and the conic coefficient of each lens of the imaging lens assembly in this Embodiment. Here, the units of the radius of curvature and the thickness are millimeters (mm).

TABLE 2

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.4037 | | | |
| S1 | aspheric | 1.5506 | 0.6691 | 1.546 | 56.11 | −0.1680 |
| S2 | aspheric | 6.9719 | 0.0559 | | | 39.6397 |
| S3 | aspheric | 4.2172 | 0.2500 | 1.666 | 20.37 | −23.8067 |
| S4 | aspheric | 2.2855 | 0.4177 | | | 2.3283 |
| S5 | aspheric | 12.2556 | 0.3747 | 1.546 | 56.11 | 74.5610 |
| S6 | aspheric | 55.0884 | 0.4949 | | | −97.7021 |
| S7 | aspheric | 320.8682 | 0.5996 | 1.546 | 56.11 | 99.0000 |
| S8 | aspheric | −2.1959 | 0.3460 | | | 0.0744 |
| S9 | aspheric | 1.6824 | 0.3030 | 1.536 | 55.77 | −20.7495 |
| S10 | aspheric | 0.7841 | 0.2693 | | | −5.4201 |
| S11 | spherical | infinite | 0.2100 | 1.517 | 64.17 | |
| S12 | spherical | infinite | 0.5097 | | | |
| S13 | spherical | infinite | | | | |

In the present embodiment, the surface type x of each aspheric surface is defined by the following formula (1):

$$x = \frac{ch^2}{1+\sqrt{1-(k+1)c^2h^2}} + \sum A_i h^i \quad (1)$$

Here, x is the distance sagittal height from the apex of the aspheric surface when the aspheric surface is at a height of h along the optical axis; c is the paraxial curvature of the aspheric surface, and c=1/R (i.e., the paraxial curvature c is the reciprocal of the radius of curvature R in Table 2 above); k is the conic coefficient (given in Table 2 above); and Ai is the correction coefficient of the $i^{th}$ order of the aspheric surface.

Table 3 below shows the higher-order coefficients $A_4$, $A_6$, $A_8$, $A_{10}$, $A_{12}$, $A_{14}$, $A_{16}$, $A_{18}$ and $A_{20}$ applicable to each aspheric surface S1-S10 of the aspheric lenses in this Embodiment.

TABLE 3

| surface number | A4 | A6 | A8 | A10 | A12 |
|---|---|---|---|---|---|
| S1 | 3.5627E−03 | 3.9418E−02 | −2.0789E−01 | 7.7127E−01 | −1.7715E+00 |
| S2 | −2.4667E−01 | 5.6780E−01 | −7.3158E−01 | 1.7487E−01 | 1.1240E+00 |
| S3 | −2.7399E−01 | 6.4904E−01 | −4.3438E−01 | −1.2552E+00 | 4.2944E+00 |
| S4 | −1.5718E−01 | 2.5501E−01 | 2.5337E−01 | −2.2024E+00 | 5.5071E+00 |

TABLE 3-continued

| | | | | | |
|---|---|---|---|---|---|
| S5 | −1.6136E−01 | 1.1902E−01 | −6.8134E−01 | 2.4345E+00 | −6.0492E+00 |
| S6 | −1.3945E−01 | 1.4559E−01 | −8.3196E−01 | 2.5566E+00 | −5.0300E+00 |
| S7 | −1.5022E−02 | −6.3556E−02 | 1.4427E−01 | −3.4565E−01 | 4.8282E−01 |
| S8 | −1.0953E−01 | 3.3426E−01 | −5.8514E−01 | 6.9055E−01 | −5.4214E−01 |
| S9 | −7.1410E−01 | 8.2187E−01 | −6.7841E−01 | 4.0721E−01 | −1.6784E−01 |
| S10 | −3.2755E−01 | 3.4609E−01 | −2.5505E−01 | 1.2841E−01 | −4.3943E−02 |

| surface number | A14 | A16 | A18 | A20 |
|---|---|---|---|---|
| S1 | 2.5343E+00 | −2.1862E+00 | 1.0400E+00 | −2.0988E−01 |
| S2 | −2.0567E+00 | 1.6081E+00 | −5.6225E−01 | 5.0939E−02 |
| S3 | −6.2839E+00 | 5.0459E+00 | −2.1121E+00 | 3.4293E−01 |
| S4 | −7.2687E+00 | 5.0274E+00 | −1.3195E+00 | −9.0465E−02 |
| S5 | 1.0017E+01 | −1.0523E+01 | 6.3090E+00 | −1.5997E+00 |
| S6 | 6.2391E+00 | −4.6955E+00 | 1.9516E+00 | −3.3888E−01 |
| S7 | −4.2004E−01 | 2.1555E−01 | −5.8583E−02 | 6.4840E−03 |
| S8 | 2.7066E−01 | −8.1136E−02 | 1.3251E−02 | −9.0641E−04 |
| S9 | 4.5672E−02 | −7.8036E−03 | 7.5682E−04 | −3.1759E−05 |
| S10 | 9.9956E−03 | −1.4442E−03 | 1.1974E−04 | −4.3246E−06 |

FIG. 2 shows a longitudinal aberration curve of the imaging lens assembly according to Embodiment 1, representing deviations of focal points of light of different wavelengths converged after passing through an optical system. FIG. 3 shows an astigmatic curve of the imaging lens assembly according to Embodiment 1, representing a curvature of a tangential image plane and a curvature of a sagittal image plane. FIG. 4 shows a distortion curve of the imaging lens assembly according to Embodiment 1, representing amounts of distortion at different viewing angles. FIG. 5 shows a lateral color curve of the imaging lens assembly according to Embodiment 1, representing deviations of different image heights on an image plane after light passes through the imaging lens assembly. In summary and referring to FIG. 2 to FIG. 5, it may be seen that the imaging lens assembly according to Embodiment 1 is an imaging lens assembly having an ultra-thin large aperture and good image quality.

Embodiment 2

The imaging lens assembly according to Embodiment 2 of the present disclosure is described below with reference to FIG. 6 to FIG. 10. In addition to the parameters of the lenses of the imaging lens assembly, for example, in addition to the radius of curvature, the thickness, the material, the conic coefficient, the effective focal length, the axial spacing distance of each lens, the higher-order coefficients of each lens, and the like, the imaging lens assembly described in the present Embodiment 2 and the following embodiments is the same in arrangement and structure as that of the imaging lens assembly described in Embodiment 1. In the present embodiment and the following embodiments, for the purpose of brevity, the description of parts similar to those in Embodiment 1 will be omitted.

FIG. 6 is a schematic structural diagram illustrating the imaging lens assembly of Embodiment 2. The imaging lens assembly includes, sequentially from an object side to an image side, a first lens E1, a second lens E2, a third lens E3, a fourth lens E4, and a fifth lens E5.

Table 4 below shows the effective focal lengths f1-f5 of the first to fifth lenses E1-E5, the total effective focal length f of the imaging lens assembly, the total track length TTL of the imaging lens assembly and the half of the maximal field-of-view HFOV of the imaging lens assembly.

TABLE 4

| | | | |
|---|---|---|---|
| f1(mm) | 3.41 | f(mm) | 3.74 |
| f2(mm) | −8.55 | TTL(mm) | 4.54 |
| f3(mm) | −2630.73 | HFOV(°) | 38.4 |
| f4(mm) | 4.01 | | |
| f5(mm) | −3.04 | | |

Table 5 shows the surface type, the radius of curvature, the thickness, the material and the conic coefficient of each lens of the imaging lens assembly in this Embodiment. Here, the units of the radius of curvature and the thickness are millimeters (mm).

TABLE 5

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.4036 | | | |
| S1 | aspheric | 1.5229 | 0.6405 | 1.546 | 56.11 | −0.1289 |
| S2 | aspheric | 7.1526 | 0.0485 | | | 37.3845 |
| S3 | aspheric | 4.0551 | 0.2500 | 1.666 | 20.37 | −30.9415 |
| S4 | aspheric | 2.3103 | 0.5083 | | | 2.4465 |
| S5 | aspheric | −48.4355 | 0.4017 | 1.546 | 56.11 | 99.0000 |
| S6 | aspheric | −50.2727 | 0.4340 | | | 70.1851 |
| S7 | aspheric | 22.4770 | 0.6410 | 1.536 | 55.77 | −22.2899 |
| S8 | aspheric | −2.4009 | 0.4749 | | | 0.2097 |
| S9 | aspheric | 2.0021 | 0.3157 | 1.546 | 56.11 | −19.3695 |
| S10 | aspheric | 0.8488 | 0.2844 | | | −4.9883 |

TABLE 5-continued

| surface number | surface type | radius of curvature | thickness | material refractive index | abbe number | conic coefficient |
|---|---|---|---|---|---|---|
| S11 | spherical | infinite | 0.2100 | 1.517 | 64.17 | |
| S12 | spherical | infinite | 0.3310 | | | |
| S13 | spherical | infinite | | | | |

Table 6 below shows the higher-order coefficients $A_4$, $A_6$, $A_8$, $A_{10}$, $A_{12}$, $A_{14}$, $A_{16}$, $A_{18}$ and $A_{20}$ applicable to each aspheric surface S1-S10 of the aspheric lenses in this Embodiment. Here, each aspheric surface type may be defined by the formula (1) given in the above Embodiment 1.

TABLE 6

| surface number | A4 | A6 | A8 | A10 | A12 |
|---|---|---|---|---|---|
| S1 | 7.5446E−03 | 2.3360E−02 | −8.7259E−02 | 2.9093E−01 | −6.3755E−01 |
| S2 | −2.6692E−01 | 6.2194E−01 | −9.1291E−01 | 7.9399E−01 | −4.5343E−01 |
| S3 | −2.6562E−01 | 6.2011E−01 | −5.6016E−01 | −2.0562E−01 | 7.8102E−01 |
| S4 | −1.3656E−01 | 2.1779E−01 | 6.5243E−02 | −7.4276E−01 | 8.9520E−01 |
| S5 | −1.5906E−01 | 1.3420E−01 | −9.9678E−01 | 4.1362E+00 | −1.0845E+01 |
| S6 | −1.4991E−01 | 1.3002E−01 | −6.3813E−01 | 1.7402E+00 | −3.0348E+00 |
| S7 | −4.0240E−02 | 7.1882E−03 | −7.8601E−02 | 8.9492E−02 | −6.0178E−02 |
| S8 | −5.1619E−02 | 1.6395E−01 | −2.9868E−01 | 3.5325E−01 | −2.8370E−01 |
| S9 | −5.7693E−01 | 5.8743E−01 | −4.3275E−01 | 2.3228E−01 | −8.4671E−02 |
| S10 | −2.6233E−01 | 2.4783E−01 | −1.6033E−01 | 6.9641E−02 | −2.0220E−02 |

| surface number | A14 | A16 | A18 | A20 |
|---|---|---|---|---|
| S1 | 9.2920E−01 | −8.5792E−01 | 4.5093E−01 | −1.0326E−01 |
| S2 | 4.5157E−01 | −7.2919E−01 | 6.1250E−01 | −1.9327E−01 |
| S3 | 2.3607E−01 | −1.8713E+00 | 1.8286E+00 | −5.9004E−01 |
| S4 | 1.0105E+00 | −3.5962E+00 | 3.5123E+00 | −1.1879E+00 |
| S5 | 1.7633E+01 | −1.7306E+01 | 9.3647E+00 | −2.1103E+00 |
| S6 | 3.3549E+00 | −2.2648E+00 | 8.4932E−01 | −1.3313E−01 |
| S7 | 7.5583E−03 | 1.5332E−02 | −8.0707E−03 | 1.2011E−03 |
| S8 | 1.4550E−01 | −4.4278E−02 | 7.2448E−03 | −4.9217E−04 |
| S9 | 2.0177E−02 | −3.0071E−03 | 2.5465E−04 | −9.3697E−06 |
| S10 | 3.8509E−03 | −4.6140E−04 | 3.1576E−05 | −9.4236E−07 |

FIG. 7 shows a longitudinal aberration curve of the imaging lens assembly according to Embodiment 2, representing deviations of focal points of light of different wavelengths converged after passing through an optical system. FIG. 8 shows an astigmatic curve of the imaging lens assembly according to Embodiment 2, representing a curvature of a tangential image plane and a curvature of a sagittal image plane. FIG. 9 shows a distortion curve of the imaging lens assembly according to Embodiment 2, representing amounts of distortion at different viewing angles. FIG. 10 shows a lateral color curve of the imaging lens assembly according to Embodiment 2, representing deviations of different image heights on an image plane after light passes through the imaging lens assembly. In summary and referring to FIG. 7 to FIG. 10, it may be seen that the imaging lens assembly according to Embodiment 2 is an imaging lens assembly having an ultra-thin large aperture and good image quality.

Embodiment 3

The imaging lens assembly according to Embodiment 3 of the present disclosure is described below with reference to FIGS. 11-15.

FIG. 11 is a schematic structural diagram illustrating the imaging lens assembly of Embodiment 3. The imaging lens assembly includes, sequentially from an object side to an image side, a first lens E1, a second lens E2, a third lens E3, a fourth lens E4, and a fifth lens E5.

Table 7 below shows the effective focal lengths f1-f5 of the first to fifth lenses E1-E5, the total effective focal length f of the imaging lens assembly, the total track length TTL of the imaging lens assembly and the half of the maximal field-of-view HFOV of the imaging lens assembly.

TABLE 7

| f1(mm) | 3.49 | f(mm) | 3.77 |
|---|---|---|---|
| f2(mm) | −7.81 | TTL(mm) | 4.50 |
| f3(mm) | 24.07 | HFOV(°) | 38.5 |
| f4(mm) | 3.88 | | |
| f5(mm) | −2.87 | | |

Table 8 shows the surface type, the radius of curvature, the thickness, the material and the conic coefficient of each lens of the imaging lens assembly in this Embodiment. Here, the units of the radius of curvature and the thickness are millimeters (mm).

TABLE 8

| surface number | surface type | radius of curvature | thickness | material refractive index | abbe number | Conic coefficient |
|---|---|---|---|---|---|---|
| OBJ | spherical | infinite | infinite | | | |
| STO | spherical | infinite | −0.3947 | | | |
| S1 | aspheric | 1.5283 | 0.6443 | 1.546 | 56.11 | −0.1920 |
| S2 | aspheric | 6.6072 | 0.0550 | | | 39.5703 |
| S3 | aspheric | 3.8195 | 0.2500 | 1.666 | 20.37 | −24.8829 |
| S4 | aspheric | 2.1456 | 0.4162 | | | 2.4649 |
| S5 | aspheric | 103.3630 | 0.3793 | 1.546 | 56.11 | 99.0000 |
| S6 | aspheric | −15.0358 | 0.5215 | | | 98.8677 |
| S7 | aspheric | −232.1383 | 0.6128 | 1.536 | 55.77 | −99.0000 |
| S8 | aspheric | −2.0993 | 0.3652 | | | −0.1308 |
| S9 | aspheric | 1.6552 | 0.2736 | 1.546 | 56.11 | −22.9295 |
| S10 | aspheric | 0.7518 | 0.2655 | | | −5.2801 |
| S11 | spherical | infinite | 0.2100 | 1.517 | 64.17 | |
| S12 | spherical | infinite | 0.5067 | | | |
| S13 | spherical | infinite | | | | |

Table 9 below shows the higher-order coefficients $A_4$, $A_6$, $A_8$, $A_{10}$, $A_{12}$, $A_{14}$, $A_{16}$, $A_{18}$ and $A_{20}$ applicable to each aspheric surface S1-S10 of the aspheric lenses in this Embodiment. Here, each aspheric surface type may be defined by the formula (1) given in the above Embodiment 1.

TABLE 9

| surface number | A4 | A6 | A8 | A10 | A12 |
|---|---|---|---|---|---|
| S1 | 1.1989E−02 | −2.3860E−02 | 2.6545E−01 | −1.1056E+00 | 2.6497E+00 |
| S2 | −2.5700E−01 | 6.2385E−01 | −1.0346E+00 | 1.5088E+00 | −2.8539E+00 |
| S3 | −2.7164E−01 | 6.6065E−01 | −6.1834E−01 | −2.0077E−01 | 6.8298E−01 |
| S4 | −1.6457E−01 | 2.2517E−01 | 4.5435E−01 | −3.3312E−01 | 9.3660E+00 |
| S5 | −1.5514E−01 | 1.7821E−01 | −1.3637E+00 | 5.9325E+00 | −1.6283E+01 |
| S6 | −1.3342E−01 | 1.1458E−01 | −7.1491E−01 | 2.3052E+00 | −4.7053E+00 |
| S7 | −2.8652E−02 | −5.7628E−03 | −1.5539E−01 | 3.5392E−01 | −4.2290E−01 |
| S8 | −7.5873E−02 | 2.4311E−01 | −5.0578E−01 | 6.8292E−01 | −5.8081E−01 |
| S9 | −7.1400E−01 | 6.9407E−01 | −4.1707E−01 | 1.6940E−01 | −4.6161E−02 |
| S10 | −3.5630E−01 | 3.6082E−01 | −2.4828E−01 | 1.1807E−01 | −3.8828E−02 |

| surface number | A14 | A16 | A18 | A20 |
|---|---|---|---|---|
| S1 | −3.7463E+00 | 3.0967E+00 | −1.3776E+00 | 2.5427E−01 |
| S2 | 5.3733E+00 | −6.6954E+00 | 4.5294E+00 | −1.2736E+00 |
| S3 | 1.1037E+00 | −3.7970E+00 | 3.6183E+00 | −1.2177E+00 |
| S4 | −1.5237E+01 | 1.4651E+01 | −7.5413E+00 | 1.5641E+00 |
| S5 | 2.7987E+01 | −2.9292E+01 | 1.7025E+01 | −4.1523E+00 |
| S6 | 6.0181E+00 | −4.6596E+00 | 1.9847E+00 | −3.5059E−01 |
| S7 | 2.8153E−01 | −1.0509E−01 | 2.0702E−02 | −1.6810E−03 |
| S8 | 3.0445E−01 | −9.4367E−02 | 1.5806E−02 | −1.1027E−03 |
| S9 | 8.3616E−03 | −9.8829E−04 | 7.1763E−05 | −2.5556E−06 |
| S10 | 8.5943E−03 | −1.2183E−03 | 9.9814E−05 | −3.5893E−06 |

FIG. 12 shows a longitudinal aberration curve of the imaging lens assembly according to Embodiment 3, representing deviations of focal points of light of different wavelengths converged after passing through an optical system. FIG. 13 shows an astigmatic curve of the imaging lens assembly according to Embodiment 3, representing a curvature of a tangential image plane and a curvature of a sagittal image plane. FIG. 14 shows a distortion curve of the imaging lens assembly according to Embodiment 3, representing amounts of distortion at different viewing angles. FIG. 15 shows a lateral color curve of the imaging lens assembly according to Embodiment 3, representing deviations of different image heights on an image plane after light passes through the imaging lens assembly. In summary and referring to FIGS. 12-15, it may be seen that the imaging lens assembly according to Embodiment 3 is an imaging lens assembly having an ultra-thin large aperture and good image quality.

Embodiment 4

The imaging lens assembly according to Embodiment 4 of the present disclosure is described below with reference to FIGS. 16-20.

FIG. 16 is a schematic structural diagram illustrating the imaging lens assembly of Embodiment 4. The imaging lens assembly includes, sequentially from an object side to an image side, a first lens E1, a second lens E2, a third lens E3, a fourth lens E4, and a fifth lens E5.

Table 10 below shows the effective focal lengths f1-f5 of the first to fifth lenses E1-E5, the total effective focal length f of the imaging lens assembly, the total track length TTL of the imaging lens assembly and the half of the maximal field-of-view HFOV of the imaging lens assembly.

TABLE 10

| | | | |
|---|---|---|---|
| f1(mm) | 3.38 | f(mm) | 3.77 |
| f2(mm) | −7.57 | TTL(mm) | 4.50 |
| f3(mm) | 37.93 | HFOV(°) | 38.5 |
| f4(mm) | 3.82 | | |
| f5(mm) | −2.97 | | |

Table 11 shows the surface type, the radius of curvature, the thickness, the material and the conic coefficient of each lens of the imaging lens assembly in this Embodiment. Here, the units of the radius of curvature and the thickness are millimeters (mm).

TABLE 11

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.4012 | | | |
| S1 | aspheric | 1.5059 | 0.6504 | 1.546 | 56.11 | 0.1437 |
| S2 | aspheric | 6.9464 | 0.0618 | | | 26.1582 |
| S3 | aspheric | 3.9016 | 0.2500 | 1.666 | 20.37 | −23.4420 |
| S4 | aspheric | 2.1433 | 0.4332 | | | 2.8239 |
| S5 | aspheric | −4051.1171 | 0.3547 | 1.546 | 56.11 | −99.0000 |
| S6 | aspheric | −20.6045 | 0.4874 | | | 99.0000 |
| S7 | aspheric | −500.3955 | 0.6344 | 1.536 | 55.77 | 99.0000 |
| S8 | aspheric | −2.0795 | 0.3251 | | | −0.6065 |
| S9 | aspheric | 1.8329 | 0.3122 | 1.546 | 56.11 | −24.6573 |
| S10 | aspheric | 0.8011 | 0.2701 | | | −5.3313 |
| S11 | spherical | infinite | 0.2100 | 1.517 | 64.17 | |
| S12 | spherical | infinite | 0.5106 | | | |
| S13 | spherical | infinite | | | | |

Table 12 below shows the higher-order coefficients $A_4$, $A_6$, $A_8$, $A_{10}$, $A_{12}$, $A_{14}$, $A_{16}$, $A_{18}$ and $A_{20}$ applicable to each aspheric surface S1-S10 of the aspheric lenses in this Embodiment. Here, each aspheric surface type may be defined by the formula (1) given in the above Embodiment 1.

FIG. 17 shows a longitudinal aberration curve of the imaging lens assembly according to Embodiment 4, representing deviations of focal points of light of different wavelengths converged after passing through an optical system. FIG. 18 shows an astigmatic curve of the imaging lens assembly according to Embodiment 4, representing a curvature of a tangential image plane and a curvature of a sagittal image plane. FIG. 19 shows a distortion curve of the imaging lens assembly according to Embodiment 4, representing amounts of distortion at different viewing angles. FIG. 20 shows a lateral color curve of the imaging lens assembly according to Embodiment 4, representing deviations of different image heights on an image plane after light passes through the imaging lens assembly. In summary and referring to FIGS. 17-20, it may be seen that the imaging lens assembly according to Embodiment 4 is an imaging lens assembly having an ultra-thin large aperture and good image quality.

TABLE 12

| surface number | A4 | A6 | A8 | A10 | A12 |
|---|---|---|---|---|---|
| S1 | −6.7618E−03 | 5.9038E−02 | −2.8301E−01 | 8.0111E−01 | −1.3260E+00 |
| S2 | −1.9956E−01 | 4.7813E−01 | −8.6756E−01 | 1.6074E+00 | −3.0527E+00 |
| S3 | −2.2780E−01 | 5.2683E−01 | −7.0626E−01 | 1.3982E+00 | −4.3495E+00 |
| S4 | −1.6211E−01 | 2.9386E−01 | −4.9361E−01 | 1.2415E+00 | −2.8693E+00 |
| S5 | −1.6687E−01 | 2.1133E−01 | −1.5650E+00 | 6.5515E+00 | −1.7361E+01 |
| S6 | −1.4412E−01 | 1.5924E−01 | −1.0058E+00 | 3.3526E+00 | −7.0050E+00 |
| S7 | −7.6202E−03 | −8.0789E−02 | 1.1716E−01 | −1.9365E−01 | 2.2117E−01 |
| S8 | −8.4663E−02 | 2.4874E−01 | −4.4858E−01 | 5.4450E−01 | −4.3658E−01 |
| S9 | −6.5123E−01 | 6.6033E−01 | −4.4702E−01 | 2.1428E−01 | −7.0366E−02 |
| S10 | −3.1083E−01 | 3.0689E−01 | −2.1160E−01 | 1.0046E−01 | −3.2797E−02 |

| surface number | A14 | A16 | A18 | A20 |
|---|---|---|---|---|
| S1 | 1.3035E+00 | −7.3576E−01 | 2.1852E−01 | −2.6386E−02 |
| S2 | 4.6178E+00 | −4.5975E+00 | 2.6153E+00 | −6.4752E−01 |
| S3 | 9.4393E+00 | −1.1695E+01 | 7.6509E+00 | −2.0764E+00 |
| S4 | 4.1538E+00 | −3.2984E+00 | 1.3199E+00 | −2.0906E−01 |
| S5 | 2.9032E+01 | −2.9834E+01 | 1.7234E+01 | −4.2389E+00 |
| S6 | 9.1876E+00 | −7.3303E+00 | 3.2485E+00 | −6.0758E−01 |
| S7 | −1.7645E−01 | 8.7902E−02 | −2.3366E−02 | 2.5037E−03 |
| S8 | 2.2009E−01 | −6.5900E−02 | 1.0655E−02 | −7.1622E−04 |
| S9 | 1.5416E−02 | −2.1608E−03 | 1.7608E−04 | −6.3816E−06 |
| S10 | 7.1815E−03 | −1.0056E−03 | 8.1317E−05 | −2.8845E−06 |

Embodiment 5

The imaging lens assembly according to Embodiment 5 of the present disclosure is described below with reference to FIGS. 21-25.

FIG. 21 is a schematic structural diagram illustrating the imaging lens assembly of Embodiment 5. The imaging lens assembly includes, sequentially from an object side to an image side, a first lens E1, a second lens E2, a third lens E3, a fourth lens E4, and a fifth lens E5.

Table 13 below shows the effective focal lengths f1-f5 of the first to fifth lenses E1-E5, the total effective focal length f of the imaging lens assembly, the total track length TTL of the imaging lens assembly and the half of the maximal field-of-view HFOV of the imaging lens assembly.

TABLE 13

| | | | |
|---|---|---|---|
| f1(mm) | 3.49 | f(mm) | 3.79 |
| f2(mm) | −7.54 | TTL(mm) | 4.50 |
| f3(mm) | 20.25 | HFOV(°) | 38.4 |
| f4(mm) | 3.52 | | |
| f5(mm) | −2.55 | | |

Table 14 shows the surface type, the radius of curvature, the thickness, the material and the conic coefficient of each lens of the imaging lens assembly in this Embodiment. Here, the units of the radius of curvature and the thickness are millimeters (mm).

TABLE 14

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.4086 | | | |
| S1 | aspheric | 1.5197 | 0.6455 | 1.546 | 56.11 | −0.0153 |
| S2 | aspheric | 6.3867 | 0.0527 | | | 34.8820 |
| S3 | aspheric | 3.8317 | 0.2500 | 1.666 | 20.37 | −24.0868 |
| S4 | aspheric | 2.1171 | 0.3936 | | | 2.0224 |
| S5 | aspheric | −95.4413 | 0.3864 | 1.546 | 56.11 | 99.0000 |
| S6 | aspheric | −9.9224 | 0.5829 | | | 11.3470 |
| S7 | aspheric | 20.2780 | 0.6152 | 1.536 | 55.77 | 93.4719 |
| S8 | aspheric | −2.1007 | 0.3599 | | | 0.1909 |
| S9 | aspheric | 2.3013 | 0.2500 | 1.546 | 56.11 | −49.6869 |
| S10 | aspheric | 0.8253 | 0.2563 | | | −6.3443 |
| S11 | spherical | infinite | 0.2100 | 1.517 | 64.17 | |
| S12 | spherical | infinite | 0.4976 | | | |
| S13 | spherical | infinite | | | | |

Table 15 below shows the higher-order coefficients $A_4$, $A_6$, $A_8$, $A_{10}$, $A_{12}$, $A_{14}$, $A_{16}$, $A_{18}$ and $A_{20}$ applicable to each aspheric surface S1-S10 of the aspheric lenses in this Embodiment. Here, each aspheric surface type may be defined by the formula (1) given in the above Embodiment 1.

TABLE 15

| surface number | A4 | A6 | A8 | A10 | A12 |
|---|---|---|---|---|---|
| S1 | 3.3760E−03 | −2.3532E−04 | 1.1593E−01 | −5.8985E−01 | 1.5161E+00 |
| S2 | −2.5725E−01 | 5.9049E−01 | −7.8765E−01 | 5.7046E−01 | −5.3378E−01 |
| S3 | −2.7149E−01 | 6.5217E−01 | −5.8440E−01 | −8.1713E−02 | −1.0782E−01 |
| S4 | −1.5517E−01 | 2.4356E−01 | 2.2583E−01 | −1.8557E+00 | 4.3024E+00 |
| S5 | −1.4895E−01 | 8.0378E−02 | −6.8985E−01 | 2.9666E+00 | −8.1368E+00 |
| S6 | −1.3113E−01 | 1.0726E−01 | −7.3413E−01 | 2.4192E+00 | −4.9465E+00 |
| S7 | −7.0321E−03 | −2.3225E−02 | −3.0709E−02 | 5.4881E−02 | −5.4377E−02 |
| S8 | 2.6390E−02 | 4.6939E−02 | −7.6000E−02 | 5.1492E−02 | −1.7462E−02 |
| S9 | −7.3130E−01 | 9.2773E−01 | −8.6217E−01 | 5.6455E−01 | −2.4194E−01 |
| S10 | −3.3776E−01 | 3.9023E−01 | −3.1864E−01 | 1.7724E−01 | −6.6368E−02 |

| surface number | A14 | A16 | A18 | A20 |
|---|---|---|---|---|
| S1 | −2.1811E+00 | 1.7866E+00 | −7.7192E−01 | 1.3595E−01 |
| S2 | 1.6472E+00 | −2.9662E+00 | 2.4273E+00 | −7.6317E−01 |
| S3 | 2.9048E+00 | −5.9259E+00 | 4.9319E+00 | −1.5551E+00 |
| S4 | −5.0147E+00 | 2.5080E+00 | 3.3156E−01 | −5.8175E−01 |
| S5 | 1.3876E+01 | −1.4252E+01 | 8.0024E+00 | −1.8012E+00 |
| S6 | 6.2982E+00 | −4.8396E+00 | 2.0465E+00 | −3.5987E−01 |
| S7 | 3.0142E−02 | −8.9838E−03 | 1.3602E−03 | −8.2634E−05 |
| S8 | 3.2310E−03 | −3.3215E−04 | 1.7842E−05 | −3.9169E−07 |
| S9 | 6.5405E−02 | −1.0661E−02 | 9.4890E−04 | −3.5183E−05 |
| S10 | 1.6395E−02 | −2.5598E−03 | 2.2866E−04 | −8.8976E−06 |

Figures 22, 23:
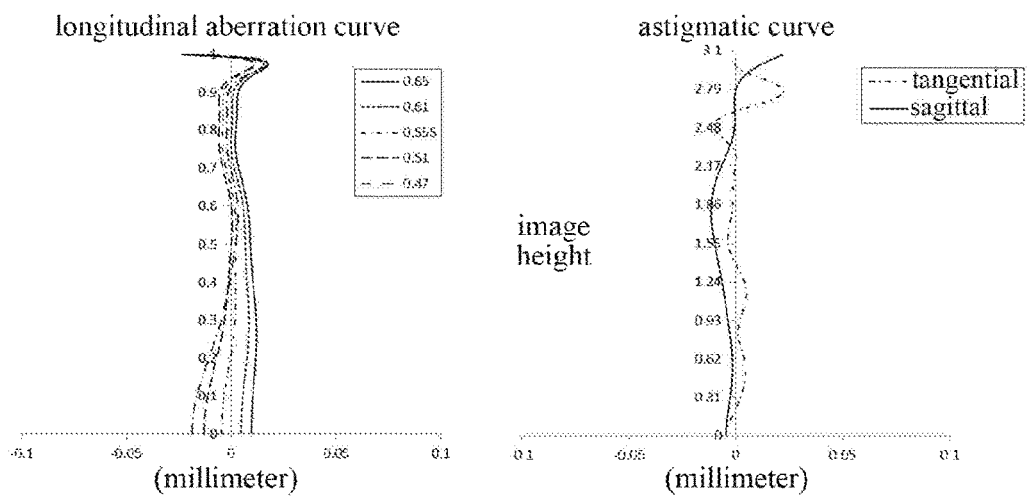
FIGS. 22-25 respectively illustrate a longitudinal aberration curve, an astigmatic curve, a distortion curve and a lateral color curve of the imaging lens assembly according to Embodiment 5.
Figures 24, 25:
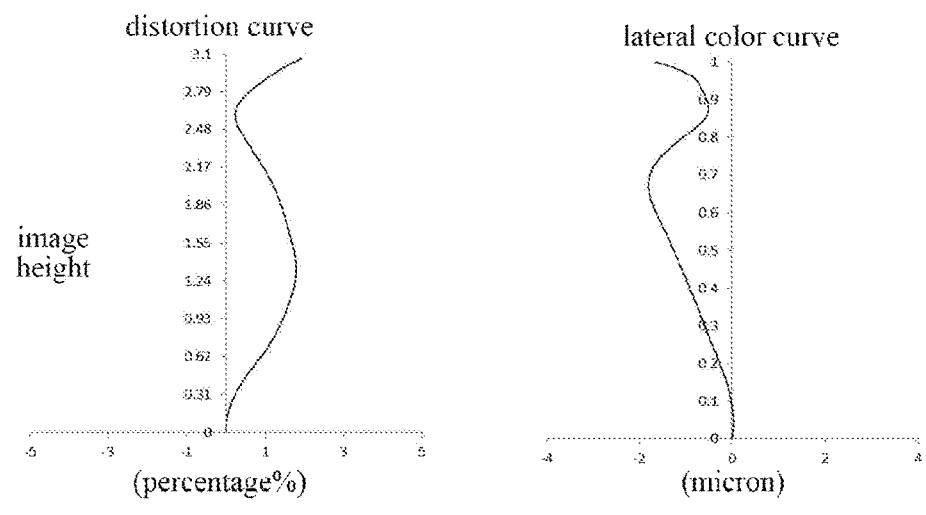

FIG. 22 shows a longitudinal aberration curve of the imaging lens assembly according to Embodiment 5, representing deviations of focal points of light of different wavelengths converged after passing through an optical system. FIG. 23 shows an astigmatic curve of the imaging lens assembly according to Embodiment 5, representing a curvature of a tangential image plane and a curvature of a sagittal image plane. FIG. 24 shows a distortion curve of the imaging lens assembly according to Embodiment 5, representing amounts of distortion at different viewing angles. FIG. 25 shows a lateral color curve of the imaging lens assembly according to Embodiment 5, representing deviations of different image heights on an image plane after light passes through the imaging lens assembly. In summary and referring to FIGS. 22-25, it may be seen that the imaging lens assembly according to Embodiment 5 is an imaging lens assembly having an ultra-thin large aperture and good image quality.

Embodiment 6

The imaging lens assembly according to Embodiment 6 of the present disclosure is described below with reference to FIGS. 26-30.

Table 16 below shows the effective focal lengths f1-f5 of the first to fifth lenses E1-E5, the total effective focal length f of the imaging lens assembly, the total track length TTL of the imaging lens assembly and the half of the maximal field-of-view HFOV of the imaging lens assembly.

TABLE 16

| f1(mm) | 3.23 | f(mm) | 3.77 |
|---|---|---|---|
| f2(mm) | −6.73 | TTL(mm) | 4.50 |
| f3(mm) | 26.92 | HFOV(°) | 38.5 |
| f4(mm) | 2.67 | | |
| f5(mm) | −2.04 | | |

Table 17 shows the surface type, the radius of curvature, the thickness, the material and the conic coefficient of each lens of the imaging lens assembly in this Embodiment. Here, the units of the radius of curvature and the thickness are millimeters (mm).

TABLE 17

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.4281 | | | |
| S1 | aspheric | 1.5039 | 0.6653 | 1.546 | 56.11 | 0.3046 |
| S2 | aspheric | 8.6803 | 0.0498 | | | 0.1000 |
| S3 | aspheric | 5.0988 | 0.2500 | 1.666 | 20.37 | −19.9624 |
| S4 | aspheric | 2.3394 | 0.4059 | | | 2.8309 |
| S5 | aspheric | −13.0692 | 0.3902 | 1.546 | 56.11 | 99.0000 |
| S6 | aspheric | −6.9905 | 0.5841 | | | 1.7093 |
| S7 | aspheric | 92.4463 | 0.6143 | 1.536 | 55.77 | 9.0000 |
| S8 | aspheric | −1.4756 | 0.3358 | | | −7.9152 |
| S9 | aspheric | −21.8583 | 0.2500 | 1.546 | 56.11 | 94.7660 |
| S10 | aspheric | 1.1540 | 0.6316 | | | −6.3694 |
| S11 | spherical | infinite | 0.2100 | 1.517 | 64.17 | |
| S12 | spherical | infinite | 0.1130 | | | |
| S13 | spherical | infinite | | | | |

FIG. 26 is a schematic structural diagram illustrating the imaging lens assembly of Embodiment 6. The imaging lens assembly includes sequentially, from an object side to an image side, a first lens E1, a second lens E2, a third lens E3, a fourth lens E4, and a fifth lens E5.

Table 18 below shows the higher-order coefficients $A_4$, $A_6$, $A_8$, $A_{10}$, $A_{12}$, $A_{14}$, $A_{16}$, $A_{18}$ and $A_{20}$ applicable to each aspheric surface S1-S10 of the aspheric lenses in this Embodiment. Here, each aspheric surface type may be defined by the formula (1) given in the above Embodiment 1.

TABLE 18

| surface number | A4 | A6 | A8 | A10 | A12 |
|---|---|---|---|---|---|
| S1 | −6.0495E−03 | 9.3704E−04 | −9.4858E−04 | 2.2970E−04 | −2.7291E−05 |
| S2 | −2.3596E−01 | 6.8898E−01 | −1.1716E+00 | 1.1787E+00 | −2.5298E−01 |
| S3 | −3.0945E−01 | 8.5059E−01 | −1.3978E+00 | 1.6557E+00 | −1.5171E+00 |
| S4 | −1.5942E−01 | 1.9639E−01 | 8.1990E−01 | −5.5068E+00 | 1.5559E+01 |
| S5 | −1.6947E−01 | −8.0226E−03 | −1.5888E−01 | 2.4817E−01 | −2.3809E−01 |
| S6 | −1.4335E−01 | 1.3260E−01 | −1.0751E+00 | 3.9599E+00 | −8.8556E+00 |
| S7 | 1.1791E−02 | −3.8832E−02 | −2.3564E−02 | 6.3294E−02 | −6.1978E−02 |
| S8 | −4.6604E−03 | 1.6911E−02 | −1.0946E−03 | −2.6317E−04 | 4.3452E−05 |
| S9 | −3.4020E−01 | 2.0851E−01 | −5.9488E−02 | 9.2829E−03 | −8.2818E−04 |
| S10 | −2.2585E−01 | 1.9150E−01 | −1.2206E−01 | 5.6266E−02 | −1.8176E−02 |

| surface number | A14 | A16 | A18 | A20 |
|---|---|---|---|---|
| S1 | 1.8407E−06 | −7.1655E−08 | 1.4958E−09 | −1.2017E−11 |
| S2 | −1.0642E+00 | 1.4811E+00 | −8.1955E−01 | 1.6855E−01 |
| S3 | 1.0927E+00 | −5.4308E−01 | 1.5274E−01 | −1.7734E−02 |
| S4 | −2.5041E+01 | 2.3264E+01 | −1.1425E+01 | 2.2772E+00 |

TABLE 18-continued

| | | | | |
|---|---|---|---|---|
| S5 | −5.8495E−02 | 3.2585E−02 | 9.2301E−02 | 3.3711E−02 |
| S6 | 1.2180E+01 | −1.0036E+01 | 4.5243E+00 | −8.4560E−01 |
| S7 | 3.1302E−02 | −8.2856E−03 | 1.0949E−03 | −5.7133E−05 |
| S8 | −2.8021E−06 | 9.3695E−08 | −1.6111E−09 | 1.1291E−11 |
| S9 | 4.4134E−05 | −1.3986E−06 | 2.4408E−08 | −1.8102E−10 |
| S10 | 3.9262E−03 | −5.3775E−04 | 4.2298E−05 | −1.4659E−06 |

FIG. 27 shows a longitudinal aberration curve of the imaging lens assembly according to Embodiment 6, representing deviations of focal points of light of different wavelengths converged after passing through an optical system. FIG. 28 shows an astigmatic curve of the imaging lens assembly according to Embodiment 6, representing a curvature of a tangential image plane and a curvature of a sagittal image plane. FIG. 29 shows a distortion curve of the imaging lens assembly according to Embodiment 6, representing amounts of distortion at different viewing angles. FIG. 30 shows a lateral color curve of the imaging lens assembly according to Embodiment 6, representing deviations of different image heights on an image plane after light passes through the imaging lens assembly. In summary and referring to FIGS. 27-30, it may be seen that the imaging lens assembly according to Embodiment 6 is an imaging lens assembly having an ultra-thin large aperture and good image quality.

Embodiment 7

The imaging lens assembly according to Embodiment 7 of the present disclosure is described below with reference to FIGS. 31-35.

Table 19 below shows the effective focal lengths f1-f5 of the first to fifth lenses E1-E5, the total effective focal length f of the imaging lens assembly, the total track length TTL of the imaging lens assembly and the half of the maximal field-of-view HFOV of the imaging lens assembly.

TABLE 19

| | | | |
|---|---|---|---|
| f1(mm) | 3.50 | f(mm) | 3.88 |
| f2(mm) | −9.18 | TTL(mm) | 4.58 |
| f3(mm) | 8.84 | HFOV(°) | 37.1 |
| f4(mm) | −1000.08 | | |
| f5(mm) | −4.85 | | |

Table 20 shows the surface type, the radius of curvature, the thickness, the material and the conic coefficient of each lens of the imaging lens assembly in this Embodiment. Here, the units of the radius of curvature and the thickness are millimeters (mm).

TABLE 20

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.3958 | | | |
| S1 | aspheric | 1.566 | 0.7090 | 1.546 | 56.11 | −0.2883 |
| S2 | aspheric | 7.148 | 0.0347 | | | 40.4507 |
| S3 | aspheric | 4.6465 | 0.3005 | 1.666 | 20.37 | −18.3504 |
| S4 | aspheric | 2.5721 | 0.2911 | | | 1.8919 |
| S5 | aspheric | 7.3127 | 0.3862 | 1.546 | 56.11 | 47.8874 |
| S6 | aspheric | −13.9327 | 0.5325 | | | −60.1885 |
| S7 | aspheric | −5.0798 | 0.6588 | 1.666 | 20.37 | 19.4686 |
| S8 | aspheric | −5.3843 | 0.2854 | | | 8.7408 |
| S9 | aspheric | 2.4239 | 0.6270 | 1.536 | 55.77 | −17.1401 |
| S10 | aspheric | 1.1410 | 0.3114 | | | −5.4979 |
| S11 | spherical | infinite | 0.2100 | 1.517 | 64.17 | |
| S12 | spherical | infinite | 0.2334 | | | |
| S13 | spherical | infinite | | | | |

Figure 31:
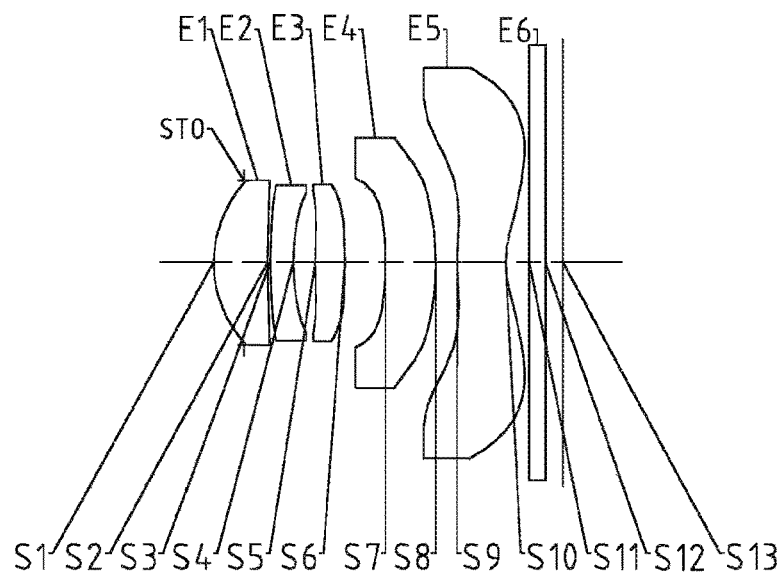
FIG. 31 illustrates a schematic structural diagram of an imaging lens assembly according to Embodiment 7.

FIG. 31 is a schematic structural diagram illustrating the imaging lens assembly of Embodiment 7. The imaging lens assembly includes, sequentially from an object side to an image side, a first lens E1, a second lens E2, a third lens E3, a fourth lens E4, and a fifth lens E5.

Table 21 below shows the higher-order coefficients $A_4$, $A_6$, $A_8$, $A_{10}$, $A_{12}$, $A_{14}$, $A_{16}$, $A_{18}$ and $A_{20}$ applicable to each aspheric surface S1-S10 of the aspheric lenses in this Embodiment. Here, each aspheric surface type may be defined by the formula (1) given in the above Embodiment 1.

TABLE 21

| surface number | A4 | A6 | A8 | A10 | A12 |
|---|---|---|---|---|---|
| S1 | 2.6824E−03 | 4.4693E−02 | −2.2926E−01 | 7.3569E−01 | −1.4878E+00 |
| S2 | −2.5786E−01 | 5.2218E−01 | −2.4306E−03 | −2.8694E+00 | 8.0894E+00 |
| S3 | −2.6286E−01 | 5.9026E−01 | −1.9524E−01 | −1.9136E+00 | 5.4999E+00 |
| S4 | −1.1933E−01 | 1.6817E−01 | 1.5192E−02 | −2.7578E−01 | −4.3381E−01 |
| S5 | −1.2621E−01 | 1.3626E−01 | −1.2272E+00 | 5.2122E+00 | −1.4132E+01 |

TABLE 21-continued

| | | | | | |
|---|---|---|---|---|---|
| S6 | −8.3530E−02 | 4.4740E−02 | −5.3387E−01 | 1.6004E+00 | −3.0888E+00 |
| S7 | 2.1756E−03 | −2.1352E−01 | 9.6781E−01 | −2.9176E+00 | 4.8380E+00 |
| S8 | −1.5405E−01 | 3.7199E−01 | −4.7458E−01 | 3.3246E−01 | −1.3705E−01 |
| S9 | −4.2992E−01 | 5.5599E−01 | −4.6105E−01 | 2.3509E−01 | −7.5105E−02 |
| S10 | −1.7978E−01 | 1.7145E−01 | −1.1010E−01 | 4.7890E−02 | −1.4512E−02 |

| surface number | A14 | A16 | A18 | A20 |
|---|---|---|---|---|
| S1 | 1.8942E+00 | −1.4711E+00 | 6.3446E−01 | −1.1698E−01 |
| S2 | −1.1767E+01 | 9.8095E+00 | −4.4318E+00 | 8.3797E−01 |
| S3 | −7.7336E+00 | 6.1865E+00 | −2.6618E+00 | 4.7126E−01 |
| S4 | 3.2757E+00 | −6.0447E+00 | 5.0250E+00 | −1.5946E+00 |
| S5 | 2.4117E+01 | −2.5177E+01 | 1.4698E+01 | −3.6315E+00 |
| S6 | 3.8571E+00 | −3.0133E+00 | 1.3505E+00 | −2.5960E−01 |
| S7 | −4.7654E+00 | 2.7227E+00 | −8.2400E−01 | 1.0187E−01 |
| S8 | 2.9185E−02 | −6.6732E−04 | −8.7486E−04 | 1.1079E−04 |
| S9 | 1.5224E−02 | −1.9082E−03 | 1.3498E−04 | −4.1164E−06 |
| S10 | 2.9863E−03 | −3.9300E−04 | 2.9522E−05 | −9.5580E−07 |

Figures 32, 33:
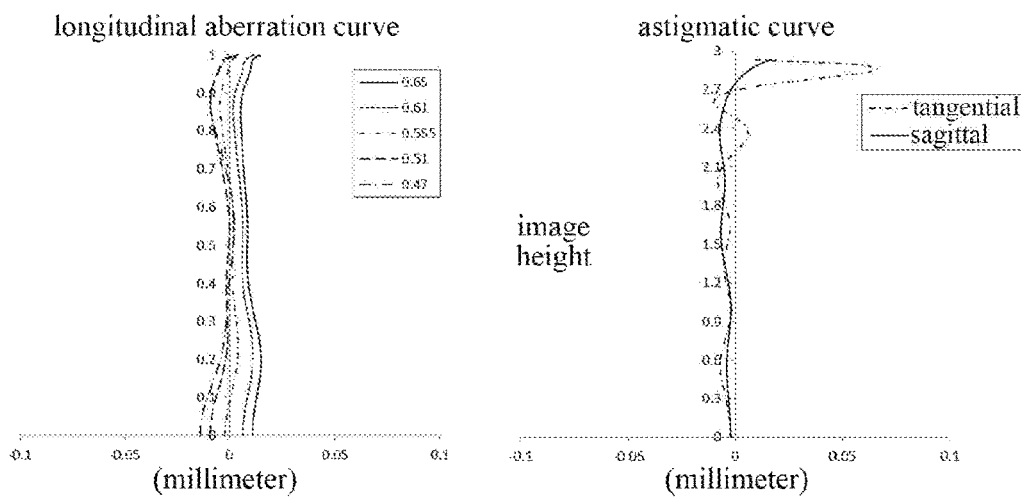
FIGS. 32-35 respectively illustrate a longitudinal aberration curve, an astigmatic curve, a distortion curve and a lateral color curve of the imaging lens assembly according to Embodiment 7.
Figures 34, 35:
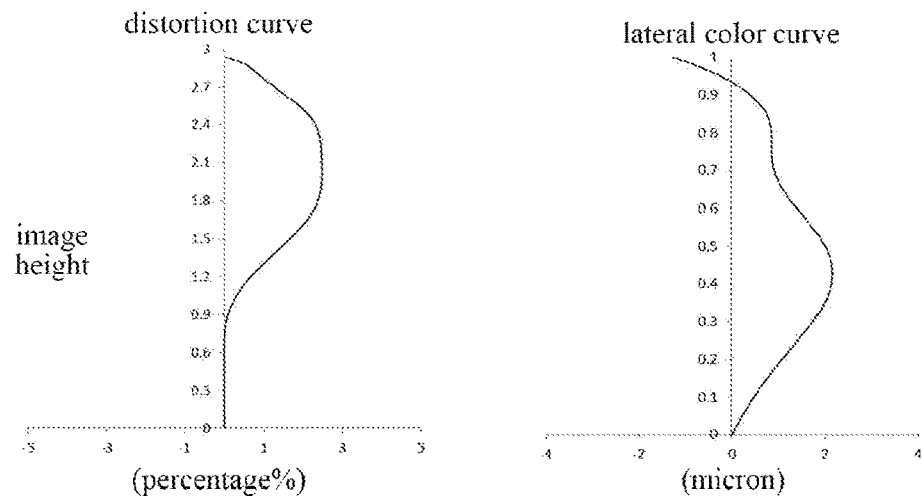

FIG. 32 shows a longitudinal aberration curve of the imaging lens assembly according to Embodiment 7, representing deviations of focal points of light of different wavelengths converged after passing through an optical system. FIG. 33 shows an astigmatic curve of the imaging lens assembly according to Embodiment 7, representing a curvature of a tangential image plane and a curvature of a sagittal image plane. FIG. 34 shows a distortion curve of the imaging lens assembly according to Embodiment 7, representing amounts of distortion at different viewing angles. FIG. 35 shows a lateral color curve of the imaging lens assembly according to Embodiment 7, representing deviations of different image heights on an image plane after light passes through the imaging lens assembly. In summary and referring to FIGS. 32-35, it may be seen that the imaging lens assembly according to Embodiment 7 is an imaging lens assembly having an ultra-thin large aperture and good image quality.

Embodiment 8

The imaging lens assembly according to Embodiment 8 of the present disclosure is described below with reference to FIGS. 36-40.

FIG. 36 is a schematic structural diagram illustrating the imaging lens assembly of Embodiment 8. The imaging lens assembly includes, sequentially from an object side to an image side, a first lens E1, a second lens E2, a third lens E3, a fourth lens E4, and a fifth lens E5.

Table 22 below shows the effective focal lengths f1-f5 of the first to fifth lenses E1-E5, the total effective focal length f of the imaging lens assembly, the total track length TTL of the imaging lens assembly and the half of the maximal field-of-view HFOV of the imaging lens assembly.

TABLE 22

| | | | |
|---|---|---|---|
| f1(mm) | 3.46 | f(mm) | 3.76 |
| f2(mm) | −8.11 | TTL(mm) | 4.50 |
| f3(mm) | 34.18 | HFOV(°) | 38.6 |
| f4(mm) | 3.73 | | |
| f5(mm) | −2.86 | | |

Table 23 shows the surface type, the radius of curvature, the thickness, the material and the conic coefficient of each lens of the imaging lens assembly in this Embodiment. Here, the units of the radius of curvature and the thickness are millimeters (mm).

TABLE 23

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.3867 | | | |
| S1 | aspheric | 1.5299 | 0.7297 | 1.546 | 56.11 | −0.1451 |
| S2 | aspheric | 6.6653 | 0.0300 | | | 38.5616 |
| S3 | aspheric | 3.8473 | 0.2500 | 1.666 | 20.37 | −28.3207 |
| S4 | aspheric | 2.1889 | 0.3936 | | | 2.0764 |
| S5 | aspheric | 173.8970 | 0.3710 | 1.546 | 56.11 | −99.0000 |
| S6 | aspheric | −20.8876 | 0.5107 | | | −1.1689 |
| S7 | aspheric | 124.6009 | 0.6397 | 1.546 | 56.11 | −98.2325 |
| S8 | aspheric | −2.0687 | 0.3444 | | | −0.1704 |
| S9 | aspheric | 1.5548 | 0.2542 | 1.536 | 55.77 | −27.0150 |
| S10 | aspheric | 0.7285 | 0.2627 | | | −5.8568 |
| S11 | spherical | infinite | 0.2100 | 1.517 | 64.17 | |
| S12 | spherical | infinite | 0.5040 | | | |
| S13 | spherical | infinite | | | | |

Table 24 below shows the higher-order coefficients $A_4$, $A_6$, $A_8$, $A_{10}$, $A_{12}$, $A_{14}$, $A_{16}$, $A_{18}$ and $A_{20}$ applicable to each aspheric surface S1-S10 of the aspheric lenses in this Embodiment. Here, each aspheric surface type may be defined by the formula (1) given in the above Embodiment 1.

TABLE 24

| surface number | A4 | A6 | A8 | A10 | A12 |
|---|---|---|---|---|---|
| S1 | 5.2087E−03 | 2.7536E−02 | −6.7676E−04 | −2.0564E−01 | 6.3126E−01 |
| S2 | −2.0011E−01 | −4.3461E−01 | 7.2270E+00 | −3.0995E+01 | 7.1669E+01 |
| S3 | −1.7374E−01 | −4.6867E−01 | 7.3205E+00 | −3.0643E+01 | 6.9123E+01 |
| S4 | −1.1659E−01 | 2.7381E−01 | −1.4932E+00 | 9.2327E+00 | −3.3382E+01 |
| S5 | −1.4651E−01 | 2.5749E−01 | −1.8668E+00 | 7.4183E+00 | −1.8131E+01 |
| S6 | −1.2692E−01 | 1.7249E−01 | −9.5316E−01 | 2.8098E+00 | −5.2269E+00 |
| S7 | −1.9927E−02 | −1.0302E−02 | −1.0463E−01 | 1.8961E−01 | −1.7387E−01 |
| S8 | −6.3232E−02 | 2.3005E−01 | −4.7257E−01 | 5.9530E−01 | −4.6349E−01 |
| S9 | −6.7778E−01 | 6.0959E−01 | −3.4161E−01 | 1.4191E−01 | −4.3612E−02 |
| S10 | −3.0931E−01 | 2.5908E−01 | −1.4301E−01 | 5.3651E−02 | −1.3755E−02 |

| surface number | A14 | A16 | A18 | A20 |
|---|---|---|---|---|
| S1 | −8.5191E−01 | 6.0203E−01 | −2.1653E−01 | 3.2373E−02 |
| S2 | −9.8775E+01 | 8.0970E+01 | −3.6538E+01 | 7.0247E+00 |
| S3 | −9.2202E+01 | 7.2136E+01 | −3.0425E+01 | 5.3163E+00 |
| S4 | 6.9408E+01 | −8.2875E+01 | 5.2889E+01 | −1.3944E+01 |
| S5 | 2.7251E+01 | −2.4546E+01 | 1.2073E+01 | −2.4469E+00 |
| S6 | 6.1551E+00 | −4.4483E+00 | 1.7987E+00 | −3.0782E−01 |
| S7 | 8.1264E−02 | −1.7947E−02 | 1.3713E−03 | 3.2655E−05 |
| S8 | 2.2369E−01 | −6.4765E−02 | 1.0275E−02 | −6.8627E−04 |
| S9 | 9.3925E−03 | −1.3174E−03 | 1.0713E−04 | −3.8149E−06 |
| S10 | 2.3410E−03 | −2.5104E−04 | 1.5265E−05 | −3.9861E−07 |

FIG. 37 shows a longitudinal aberration curve of the imaging lens assembly according to Embodiment 8, representing deviations of focal points of light of different wavelengths converged after passing through an optical system. FIG. 38 shows an astigmatic curve of the imaging lens assembly according to Embodiment 8, representing a curvature of a tangential image plane and a curvature of a sagittal image plane. FIG. 39 shows a distortion curve of the imaging lens assembly according to Embodiment 8, representing amounts of distortion at different viewing angles. FIG. 40 shows a lateral color curve of the imaging lens assembly according to Embodiment 8, representing deviations of different image heights on an image plane after light passes through the imaging lens assembly. In summary and referring to FIGS. 37-40, it may be seen that the imaging lens assembly according to Embodiment 8 is an imaging lens assembly having an ultra-thin large aperture and good image quality.

Embodiment 9

The imaging lens assembly according to Embodiment 9 of the present disclosure is described below with reference to FIGS. 41-45.

FIG. 41 is a schematic structural diagram illustrating the imaging lens assembly of Embodiment 9. The imaging lens assembly includes sequentially, from an object side to an image side, a first lens E1, a second lens E2, a third lens E3, a fourth lens E4, and a fifth lens E5.

Table 25 below shows the effective focal lengths f1-f5 of the first to fifth lenses E1-E5, the total effective focal length f of the imaging lens assembly, the total track length TTL of the imaging lens assembly and the half of the maximal field-of-view HFOV of the imaging lens assembly.

TABLE 25

| f1(mm) | 3.39 | f(mm) | 3.74 |
|---|---|---|---|
| f2(mm) | −6.89 | TTL(mm) | 4.50 |
| f3(mm) | 17.97 | HFOV(°) | 38.7 |
| f4(mm) | 3.76 | | |
| f5(mm) | −2.72 | | |

Table 26 shows the surface type, the radius of curvature, the thickness, the material and the conic coefficient of each lens of the imaging lens assembly in this Embodiment. Here, the units of the radius of curvature and the thickness are millimeters (mm).

TABLE 26

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3807 | | | |
| S1 | aspheric | 1.5674 | 0.7763 | 1.546 | 56.11 | 0.2126 |
| S2 | aspheric | 8.4426 | 0.0832 | | | −90.3510 |
| S3 | aspheric | 12.1005 | 0.2500 | 1.666 | 20.37 | 97.1981 |
| S4 | aspheric | 3.3012 | 0.2929 | | | 2.8491 |
| S5 | aspheric | 9.7853 | 0.4309 | 1.546 | 56.11 | −99.0000 |

TABLE 26-continued

| surface number | surface type | radius of curvature | thickness | material refractive index | abbe number | conic coefficient |
|---|---|---|---|---|---|---|
| S6 | aspheric | 3411.4325 | 0.5167 | | | 99.0000 |
| S7 | aspheric | 26.2478 | 0.5824 | 1.546 | 56.11 | −99.0000 |
| S8 | aspheric | −2.2084 | 0.3273 | | | −3.5321 |
| S9 | aspheric | 2.0866 | 0.2770 | 1.536 | 55.77 | −43.3115 |
| S10 | aspheric | 0.8178 | 0.2561 | | | −6.0479 |
| S11 | spherical | infinite | 0.2100 | 1.517 | 64.17 | |
| S12 | spherical | infinite | 0.4973 | | | |
| S13 | spherical | infinite | | | | |

Table 27 below shows the higher-order coefficients $A_4$, $A_6$, $A_8$, $A_{10}$, $A_{12}$, $A_{14}$, $A_{16}$, $A_{18}$ and $A_{20}$ applicable to each aspheric surface S1-S10 of the aspheric lenses in this Embodiment. Here, each aspheric surface type may be defined by the formula (1) given in the above Embodiment 1.

TABLE 27

| surface number | A4 | A6 | A8 | A10 | A12 |
|---|---|---|---|---|---|
| S1 | −8.7109E−03 | 1.7758E−02 | −6.8614E−02 | 1.4862E−01 | −1.8254E−01 |
| S2 | −8.1514E−02 | 2.0220E−01 | 1.1057E−01 | −2.5003E+00 | 9.2250E+00 |
| S3 | −2.0638E−01 | 7.0465E−01 | −2.2332E+00 | 6.1728E+00 | −1.1350E+01 |
| S4 | −1.3478E−01 | 2.3677E−01 | 8.1028E−01 | −6.1563E+00 | 1.8647E+01 |
| S5 | −1.4966E−01 | −9.8013E−02 | 9.3924E−01 | −4.1372E+00 | 1.0371E+01 |
| S6 | −1.2901E−01 | 1.8854E−03 | −4.0460E−02 | 1.9848E−01 | −6.3839E−01 |
| S7 | −1.5503E−02 | −5.3656E−02 | 2.1497E−02 | 3.8237E−03 | −2.6676E−02 |
| S8 | −4.8164E−02 | 1.9273E−02 | −3.7401E−03 | 2.3901E−04 | 7.5229E−07 |
| S9 | −6.2798E−02 | 4.8191E−01 | −1.8853E−01 | 4.1177E−02 | −5.1864E−03 |
| S10 | −3.1356E−01 | 2.9773E−01 | −2.1119E−01 | 1.1245E−01 | −4.2982E−02 |

| surface number | A14 | A16 | A18 | A20 |
|---|---|---|---|---|
| S1 | 1.2387E−01 | −4.4460E−02 | 7.7384E−03 | −4.9383E−04 |
| S2 | −1.7256E+01 | 1.7515E+01 | −9.0945E+00 | 1.8824E+00 |
| S3 | 1.2527E+01 | −7.8928E+00 | 2.6045E+00 | −3.4833E−01 |
| S4 | −3.1576E+01 | 3.0541E+01 | −1.5604E+01 | 3.2493E+00 |
| S5 | −1.5962E+01 | 1.4763E+01 | −7.5332E+00 | 1.6557E+00 |
| S6 | 1.1033E+00 | −1.0368E+00 | 5.0818E−01 | −9.8937E−02 |
| S7 | 2.1037E−02 | −6.8587E−03 | 1.0242E−03 | −5.8057E−05 |
| S8 | −8.7171E−07 | 4.6578E−08 | −1.0491E−09 | 8.9884E−12 |
| S9 | 3.9076E−04 | −1.7559E−05 | 4.3816E−07 | −4.7167E−09 |
| S10 | 1.1127E−02 | −1.8377E−03 | 1.7427E−04 | −7.2208E−06 |

FIG. 42 shows a longitudinal aberration curve of the imaging lens assembly according to Embodiment 9, representing deviations of focal points of light of different wavelengths converged after passing through an optical system. FIG. 43 shows an astigmatic curve of the imaging lens assembly according to Embodiment 9, representing a curvature of a tangential image plane and a curvature of a sagittal image plane. FIG. 44 shows a distortion curve of the imaging lens assembly according to Embodiment 9, representing amounts of distortion at different viewing angles. FIG. 45 shows a lateral color curve of the imaging lens assembly according to Embodiment 9, representing deviations of different image heights on an image plane after light passes through the imaging lens assembly. In summary and referring to FIGS. 42-45, it may be seen that the imaging lens assembly according to Embodiment 9 is an imaging lens assembly having an ultra-thin large aperture and good image quality.

To sum up, in the above Embodiment 1 to Embodiment 9, the conditional formulas satisfy the conditions shown in Table 28 below.

TABLE 28

| Formula | Embodiment | | | | | | | | |
| | 1 | 2 | 3 | 4 | 5 | 6 | 7 | 8 | 9 |
|---|---|---|---|---|---|---|---|---|---|
| f/EPD | 1.70 | 1.78 | 1.79 | 1.79 | 1.79 | 1.79 | 1.80 | 1.79 | 1.79 |
| CRA4 | 0.96 | 5.59 | 0.33 | 4.33 | 5.98 | 11.27 | 4.70 | 0.96 | 5.36 |
| R2/R3 | 1.65 | 1.76 | 1.73 | 1.78 | 1.67 | 1.70 | 1.54 | 1.73 | 0.70 |
| f1/CT1 | 5.23 | 5.32 | 5.41 | 5.20 | 5.41 | 4.85 | 4.94 | 4.75 | 4.37 |
| f/CT4 | 6.26 | 5.84 | 6.16 | 5.95 | 6.15 | 6.14 | 5.89 | 5.88 | 6.42 |
| f/f1 | 1.07 | 1.10 | 1.08 | 1.12 | 1.08 | 1.17 | 1.11 | 1.09 | 1.10 |

TABLE 28-continued

| Formula | Embodiment | | | | | | | | |
|---|---|---|---|---|---|---|---|---|---|
| | 1 | 2 | 3 | 4 | 5 | 6 | 7 | 8 | 9 |
| f/f2 | −0.48 | −0.44 | −0.48 | −0.50 | −0.50 | −0.56 | −0.42 | −0.46 | −0.54 |
| f/f5 | −1.21 | −1.23 | −1.31 | −1.27 | −1.48 | −1.85 | −0.80 | −1.31 | −1.38 |
| f/f12 | 0.72 | 0.78 | 0.73 | 0.76 | 0.72 | 0.75 | 0.81 | 0.75 | 0.70 |
| R1/R2 | 0.22 | 0.21 | 0.23 | 0.22 | 0.24 | 0.17 | 0.22 | 0.23 | 0.19 |
| f/R4 | 1.64 | 1.62 | 1.76 | 1.76 | 1.79 | 1.61 | 1.51 | 1.72 | 1.13 |
| |f/R7| | 0.01 | 0.17 | 0.02 | 0.01 | 0.19 | 0.04 | 0.76 | 0.03 | 0.14 |
| TTL/ImgH | 1.47 | 1.49 | 1.47 | 1.47 | 1.47 | 1.47 | 1.56 | 1.47 | 1.47 |

The foregoing is only a description of the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present disclosure with (but not limited to), technical features with similar functions.

What is claimed is:

1. An imaging lens assembly comprising, sequentially from an object side to an image side, a first lens, a second lens, a third lens, a fourth lens and a fifth lens,
    wherein an effective focal length f of the imaging lens assembly and an entrance pupil diameter EPD of the imaging lens assembly satisfy: f/EPD≤1.8, and an incident angle of a chief ray corresponding to a maximal field-of-view incident on an object-side surface of the fourth lens CRA4<15°,
    wherein, 4.0<f1/CT1<6.0, f1 is an effective focal length of the first lens, and CT1 is a center thickness of the first lens, and
    wherein, −2.0<f/f5<−0.7, f is the effective focal length of the imaging lens assembly, and f5 is an effective focal length of the fifth lens.

2. The imaging lens assembly according to claim 1, wherein,
    the first lens has a positive refractive power, and an object-side surface of the first lens is a convex surface;
    the second lens has a negative refractive power;
    the third lens has a positive refractive power or a negative refractive power;
    the fourth lens has a positive refractive power or a negative refractive power; and
    the fifth lens has a negative refractive power, and an image-side surface of the fifth lens is a concave surface at a paraxial position and changes from concave to convex as the image-side surface moves away from an optical axis.

3. The imaging lens assembly according to claim 2, wherein, 0.5<R2/R3<2.0, R2 is a radius of curvature of an image-side surface of the first lens, and R3 is a radius of curvature of an object-side surface of the second lens.

4. The imaging lens assembly according to claim 3, wherein, 5.5<f/CT4<7.0, f is the effective focal length of the imaging lens assembly, and CT4 is a center thickness of the fourth lens.

5. The imaging lens assembly according to claim 2, wherein, 1.0≤f/f1<1.5, f is the effective focal length of the imaging lens assembly, and f1 is an effective focal length of the first lens.

6. The imaging lens assembly according to claim 5, wherein, −1.0<f/f2<−0.3, f is the effective focal length of the imaging lens assembly, and f2 is an effective focal length of the second lens.

7. The imaging lens assembly according to claim 2, wherein, |f/R7|<1.0, f is the effective focal length of the imaging lens assembly, and R7 is a radius of curvature of the object-side surface of the fourth lens.

8. The imaging lens assembly according to claim 2, wherein, TTL/ImgH≤1.6, TTL is an axial distance from the object-side surface of the first lens to an image plane, and ImgH is half of a diagonal length of an effective pixel area on the image plane.

9. The imaging lens assembly according to claim 1, wherein, R1/R2<0.5, R1 is a radius of curvature of an object-side surface of the first lens, and R2 is a radius of curvature of an image-side surface of the first lens.

10. An imaging lens assembly comprising, sequentially from an object side to an image side, a first lens, a second lens, a third lens, a fourth lens and a fifth lens, wherein,
    the first lens has a positive refractive power, and an object-side surface of the first lens is a convex surface;
    the second lens has a negative refractive power;
    the third lens has a positive refractive power or a negative refractive power;
    the fourth lens has a positive refractive power or a negative refractive power;
    the fifth lens has a negative refractive power; and
    an effective focal length f of the imaging lens assembly and a combined focal length f12 of the first lens and the second lens satisfy: 0.7≤f/f12<1.0, and
    wherein, 4.0<f1/CT1<6.0, f1 is an effective focal length of the first lens, and CT1 is a center thickness of the first lens,
    wherein, 0.5<R2/R3<2.0, R2 is a radius of curvature of an image-side surface of the first lens, and R3 is a radius of curvature of an object-side surface of the second lens, and
    wherein, 5.5<f/CT4<7.0, f is the effective focal length of the imaging lens assembly, and CT4 is a center thickness of the fourth lens.

11. The imaging lens assembly according to claim 10, wherein,
    an image-side surface of the fifth lens is a concave surface at a paraxial position and changes from concave to convex as the image-side surface moves away from an optical axis.

12. The imaging lens assembly according to claim 11, wherein, the effective focal length f of the imaging lens assembly and an entrance pupil diameter EPD of the imaging lens assembly satisfy: f/EPD≤1.8, and an incident angle of a chief ray corresponding to a maximal field-of-view incident on an object-side surface of the fourth lens CRA4<15°.

13. The imaging lens assembly according to claim 11, wherein, TTL/ImgH≤1.6, TTL is an axial distance from the object-side surface of the first lens to an image plane, and ImgH is half of a diagonal length of an effective pixel area on the image plane.

14. The imaging lens assembly according to claim 10, wherein, −1.0<f/f2<−0.3, f is the effective focal length of the imaging lens assembly, and f2 is an effective focal length of the second lens.

15. The imaging lens assembly according to claim 10, wherein, R1/R2<0.5, R1 is a radius of curvature of the object-side surface of the first lens, and R2 is a radius of curvature of an image-side surface of the first lens.

16. The imaging lens assembly according to claim 10, wherein, 1.0<f/R4<2.0, f is the effective focal length of the imaging lens assembly, and R4 is a radius of curvature of an image-side surface of the second lens.

* * * * *